United States Patent

[11] 3,576,433

[72] Inventors Edwin S. Lee, III;
Mathias L. Biewer, Claremont, Calif.
[21] Appl. No. 724,973
[22] Filed Apr. 29, 1968
[45] Patented Apr. 27, 1971
[73] Assignee MSI Data Corporation
Montclair, Calif.

[54] DATA ENTRY VERIFICATION SYSTEM
37 Claims, 21 Drawing Figs.

[52] U.S. Cl. .................... 235/153, 340/146.1, 340/172.5
[51] Int. Cl. .................... G06f 11/00, G08c 25/00
[50] Field of Search .................... 340/146.1, 365, 172.5; 235/153; 179/2

[56] References Cited

UNITED STATES PATENTS

| | | | |
|---|---|---|---|
| 2,737,647 | 3/1956 | Oliwa | 340/146.1X |
| 3,245,040 | 4/1966 | Burdett et al. | 235/153X |
| 3,382,487 | 5/1968 | Sharon et al. | 179/2X |
| 3,401,396 | 9/1968 | Wolf et al. | 179/2X |
| 3,430,226 | 2/1969 | Chow et al. | 340/365X |
| 3,248,705 | 4/1966 | Dammann et al. | 340/172.5 |

*Primary Examiner*—Malcolm A. Morrison
*Assistant Examiner*—Charles E. Atkinson
*Attorney*—Christie, Parker and Hale

ABSTRACT: An electronic system adapted for recording items to be ordered and to transmit the ordering information in terms of binary coded decimal signals for computer processing at a remote location. The system includes a key operated input device for generating electrical signals and timing signals to be entered into the system. The data signals are stored in a temporary storage register and error checked to determine the identity between the generated signals and the stored signals as well as the operability of the input device and the associated circuits and checked for any operator errors. The correct or corrected data signals are transferred to a permanent storage medium wherein they are recorded on a single track with the data signals and the timing signals alternately and sequentially recorded. The recorded signals may then be converted to audio tones for transmission by a phone to a central receiver.

Patented April 27, 1971 3,576,433

16 Sheets-Sheet 1

INVENTORS.
EDWIN S. LEE, III
MATHIAS L. BIEWER
BY
Christie, Parker & Hale
ATTORNEYS

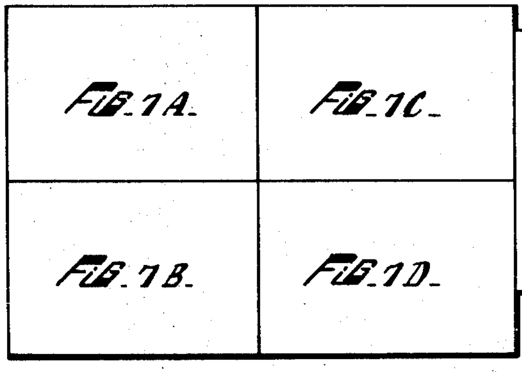
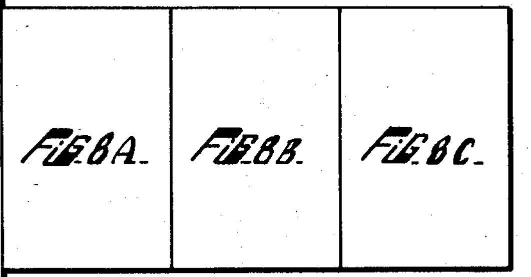
FIG. 8
FIG. 7
FIG. 6
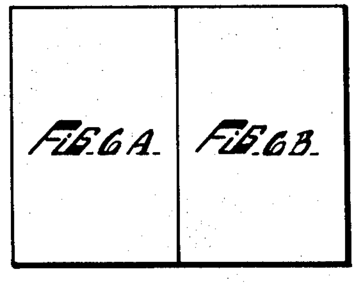
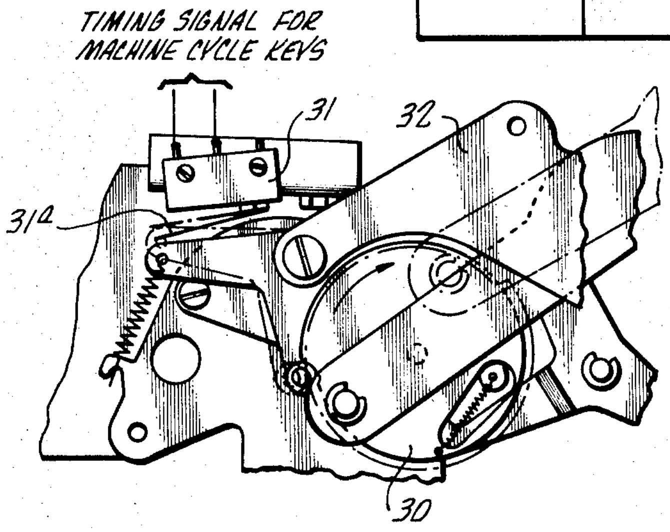
FIG. 5
FIG. 4
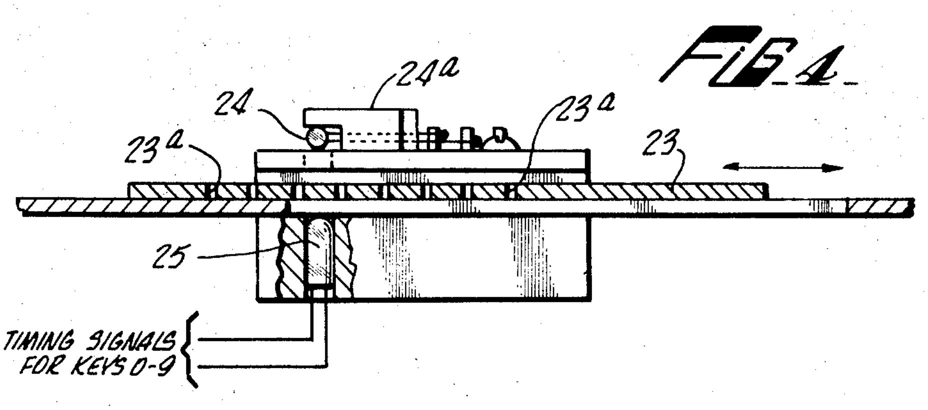

Patented April 27, 1971 3,576,433

16 Sheets-Sheet 5

Patented April 27, 1971 3,576,433

16 Sheets-Sheet 13

Patented April 27, 1971 3,576,433

16 Sheets-Sheet 15

DATA ENTRY VERIFICATION SYSTEM

ELECTRONIC SYSTEM

This invention relates to an electronic system and more particularly to an electronic system for recording information at one location and transmitting the information to a distant point for further processing.

At the present time there has been developed electronic systems designed primarily to speed and simplify ordering of items for supermarkets and other large volume retailers. These electronic systems reduce the time required for ordering items, item by item, by means of manual means. Prior to the introduction of these electronic systems it required a clerk to inspect each of the shelves in a supermarket or drug store, item by item, to determine the availability of the item and to record the need for reordering the item and the quantity thereof. This has been done in the past by manually recording and transmitting the ordering information either by telephone or by mail. It should be readily appreciated that such manual means are subject to many human errors in the ordering process. At the present time electronic systems are in use for such large volume retailers and the like. In these systems, a clerk checks the need to order or reorder an item and records the necessary order on magnetic tape. Upon playback of the magnetic tape, the recorded signals are converted to audio signals and transmitted by means of the telephone to a wholesaler for filling the order. The electronic ordering systems that are presently available, however, are relatively expensive and do not incorporate any error detecting features in the system itself thereby leading to the ordering of erroneous items or erroneous quantities. At the present time, then, there is a need for an electronic system designed primarily to simplify the ordering of items for supermarkets, drug stores and other large volume retailers from a central wholesaler. Any such improved system must be simple for an operator to learn to use and, more particularly, the system must incorporate automatic error detecting features to insure that the correct items are ordered and any errors detected prior to actually placing the order with the wholesaler.

The present invention provides an electronic system particularly adapted for recording items to be ordered for wholesalers and to transmit the ordering information in terms of binary coded decimal signals for computer processing at the warehouse. The present invention provides an improved and relatively inexpensive electronic recording and transmission system that incorporates error detecting features which immediately tells the operator that he has improperly entered data into the system or that the equipment is operating improperly thereby preventing the recording and transmission of erroneous data. The present invention incorporates error detecting features that allow for the correction of such errors prior to the actual recording of the information and also provides for the correction of errors that are detected after erroneous data has been recorded and prior to transmission. The error detecting features of the invention are associated with an input device for entering the information into the system by means of a conventional adding machine that has been modified for the purposes of entering data or information into the system. The adding machine affords inexpensive means of entering information into the system and by simultaneously printing out the entered information affords a visible, permanent record of the information to be recorded on the tape system for checking purposes.

Further advantages of the present invention reside in the employment of a magnetic tape system for recording the ordering information and which tape system may also be employed with the same electronic system employed for recording and without any further handling of the tape system for playing back the recorded information for transmission to the wholesaler or receiving center. By employing an improved recording technique with the magnetic tape system of the present invention higher recording densities are achieved, more information is recorded at higher densities for this class of recorder allowing entire orders to be recorded on a single tape thereby rendering the entire system more economical to use. For this purpose, the information is recorded in a single track of the magnetic tape system along with the timing information for the associated data.

From a structural standpoint the present invention is directed to the recording-transmitting portion of an electronic ordering system which conventionally includes a recording-transmitting system for transmitting an "order" by means of acoustic signals over a standard telephone line to a receiver. The receiver also includes a dataphone for receiving the acoustic pulses and converting the information into binary coded information. The binary coded information is then processed by means of a computer that prints out the correct "order" so that the order may be conveniently filled at the warehouse. The information transmitted to the computer may in accordance with the present invention include erroneously transmitted information along with the information for correcting source erroneous information and will be processed by the computer so that the order printed out from the computer will be the "correct" order. The printout of the information from the computer will be in the conventional form such as the identification of the item, i.e., "one case of green beans, No. 6" and have the wholesaler's number associated therewith. These orders are usually arranged in a logical fashion relative to the storage areas for the items in the warehouse to facilitate the filling of the order in a minimum amount of time.

The present invention provides an improved recording and transmitting system employing a ten-key adding machine as an input device for entering the information or data to be recorded by means of a magnetic tape system that is employed for both recording and transmitting purposes. The adding machine advantageously employs the conventional printout means and which machine has been modified to provide electrical signals representative of the operation of each of the keys on the machine. Timing signals are also generated along with the generation of each electrical signal representative of a particular piece of information to be entered into the system. The data or numerical information that is to be entered into the system is encoded in a preferred binary coded arrangement and immediately entered into a temporary storage register for this purpose. Along with the operation of the input device, the error detecting means of the recording system comes into operation so that the operator may check his keying operations and the operability of the electronic elements of the system. The error check is afforded by both visual and audio means so that the keying errors may be detected before erroneous information is recorded. When correct or corrected information is stored in the temporary storage means, it is immediately transferred from the storage register onto the magnetic tape system under the control of the timing signals provided by the input device. The information is recorded on the tape in a fashion so that each piece of information or binary bit is associated with a timing signal. The binary bits are recorded alternately with a clock or timing signal in a serial fashion on the same track of the magnetic tape. After the information is recorded it may be immediately played back from the same magnetic tape system by means of the same transducer employed for recording. The signals derived from the magnetic tape system are converted into audiotones for transmission over the telephone lines.

These and other features of the present invention may be more fully appreciated when considered in the light of the following specification and drawings, in which:

FIG. 4 is a partial, elevational view with parts in section of the optical system for generating the timing signals for the numerical keys of the input device of FIG. 1;

FIG. 5 is a partial, elevational view of the machine elements showing the switching arrangement for generating the timing signals for the machine cycle keys;

Figure 1:
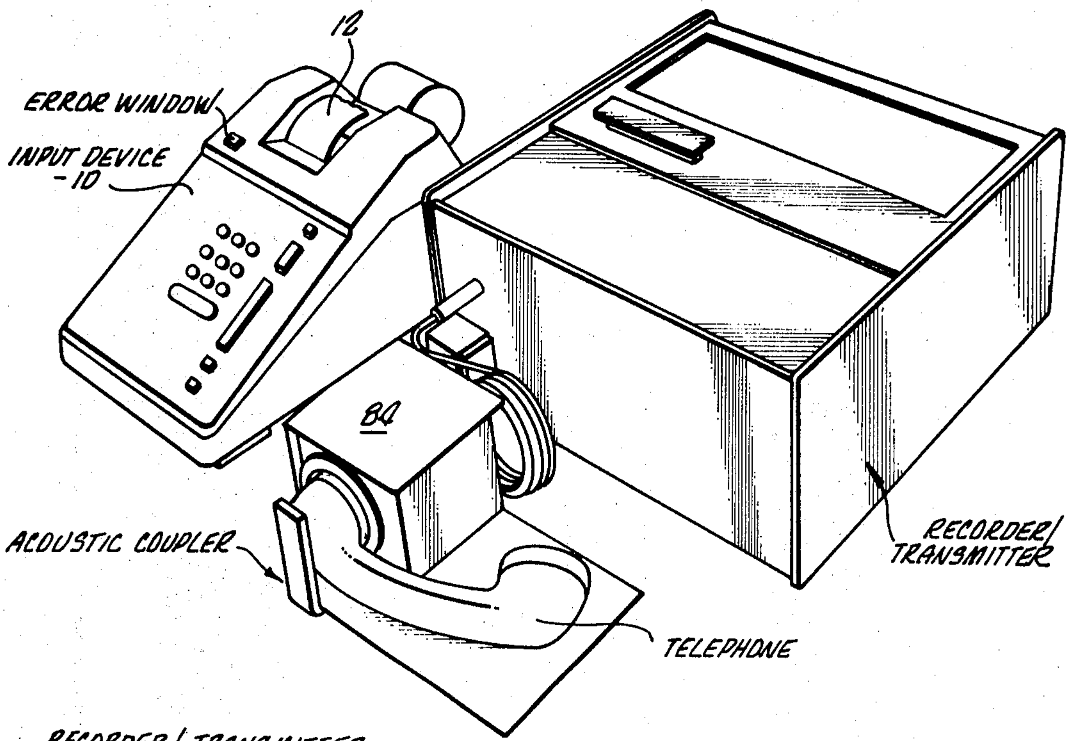
FIG. 1 is a diagrammatic illustration of the elements of the system embodying the invention.

The principal elements of the present system are illustrated as they are packaged as three separate elements in FIG. 1. The information or data signals are entered into the system by means of an input device 10 which is modified commercially available adding machine. The input device 10 is plugged into the recorder/transmitter from which it is powered. The electrical signals generated as a result of the operation of the input service 10 are coupled into the recorder/transmitter. The latter unit includes a magnetic tape system for recording the data signals received form the input device 10. These stored signals can then be played back for transmission purposes. When the recorded data is to be transmitted to a distant point this is conveniently done by converting the electrical signals recorded on the magnetic tape to corresponding audiotones and by means of an acoustic coupler transmitted by means of the ordinary telephone to the distant location. When the equipment is employed for transmitting orders to a central warehouse from a retailer this is the usual arrangement. The warehouse si equipped with the necessary receiving and computing equipment to process the transmitted information and "execute the order."

Figure 2:
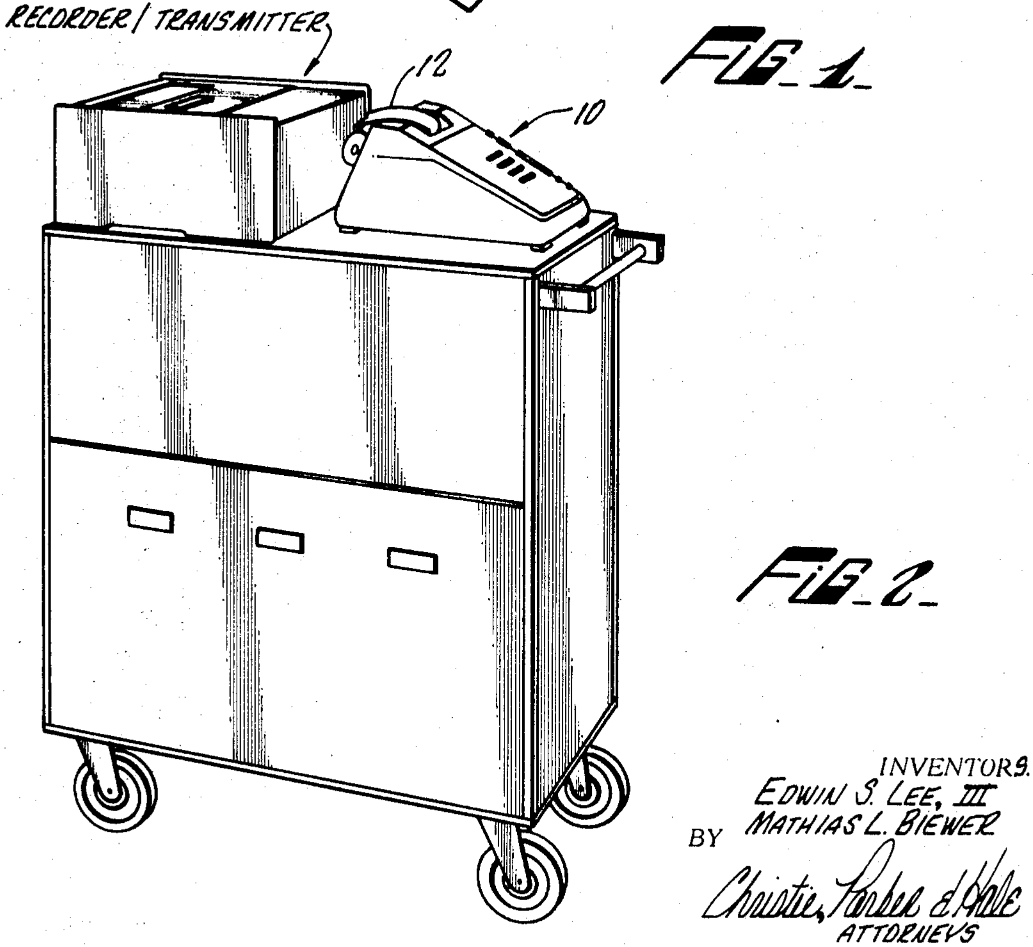
FIG. 2 is a diagrammatic illustration of the electronic system of the present invention mounted on a cart for portable use.

These system elements can be incorporated into a portable power cart for use by the retailer. A typical power cart is illustrated in FIG. 2 mounting the input device 10 and the recorder/transmitter. The power cart includes a battery and battery charger for powering the associated units. The use of this power cart allows the retailer's clerks to move up and down the store aisles inspecting the stock on the shelves and recording the items that the to be reordered through the operation of the input device 10. This information is recorded on the magnetic tape unit of the recorder/transmitter. When all the stock has been examined the clerk can take the recorder to a telephone and with the electronics associated with the recorder/transmitter and the aid of an acoustic coupler transmit the order to the wholesaler. The telephone mouthpiece is held to the acoustic coupler in the proper position to allow the audio signals to be transmitted.

The input device 10 is in the form of a conventional, commercially available calculating machine. The input device of the present invention is a modification of a 10-key adding machine manufactured commercially by the Victor Comptometer Corporation, Business Machines Division, 3900 N. Rockwell St., Chicago, Ill. In particular, the Victor adding machine employed is the eight column, electrically operated credit balance Victor Imperial model having Model No. 17-58-54. The normal operation of such an adding machine is not altered for the purposes of the present invention and the modifications required for converting the machine to an input device does not interfere with the normal operation. Accordingly, only those parts of the machine required for the understanding of the modifications of the machine for the purposes of the present invention will be described. For a more detailed description of the various parts of the adding machine per se, reference may be had to the service manual for the aforementioned Victor adding machine publicly available through Victor Comptometer Corporation.

The input device 10, as mentioned hereinabove, is a 10-key adding machine wherein the ten numerical keys are normally identified with the decimal digits 0—9 thereon. The numerical keys are shown in the central portion of the key bank as the operator faces the machine in operating same. In addition, there are five keys that are normally considered as the machine function keys. These keys are shown to the right of the numerical keys and are identified reading from the top to the bottom as the N key, the "—" (minus) key, the entry key, the T (total) key and the S (subtotal) key. All of the keys are appropriately marked with the exception of the entry key which is also considered the motor bar or the "+" (plus) key and sets the machine into operation upon the depression thereof. The remaining key is the unmarked key arranged to the left of the numerical keys and is considered the C key or the clear key. Upon operation of this C key any erroneous information entered into the machine may be cleared so that the machine can be operated anew. The seventeenth key, the R key, normally provided for the aforementioned Victor model is not employed for the purposes of the input device 10. The selected model of the adding machine also provides a printout for all of the entries made into the machine and the paper tape 12 upon which the entries are recorded is shown in its typical position.

Figure 3:
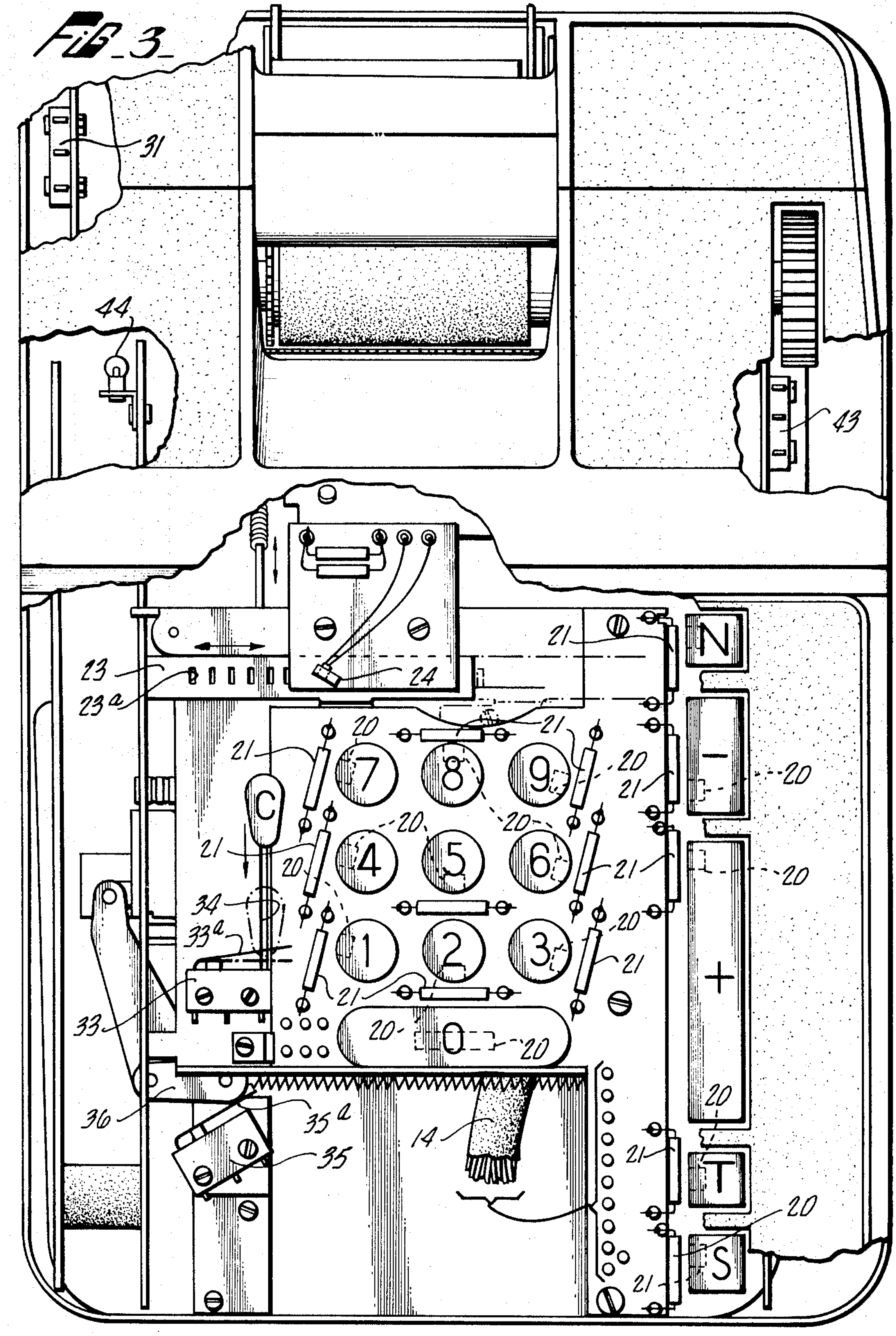
FIG. 3 is a top plan view, with the cover removed, and portions broken away of the input device illustrated in FIG. 1.

The electrical signals generated by the input device 10 are generated substantially simultaneously with the operation of each of the aforementioned numerical keys and the machine function keys including the clear key. For the purposes of generating the desired electrical signals for use in associated electrical systems each of the keys with the exception of the C key is provided with a flux generating element in the form of a magnet 20. The magnet 20 is mounted into an opening drilled into one side of the key proper by cementing it or the like into the opening so as to be carried by the key and movable therewith. The magnets 20 are mounted at the side of the keys except the 0 key. The magnet 20 for the 0 key is cemented to the top inside surface of the key as indicated in FIG. 3. Associated with each of the aforementioned keys is a hermetically sealed proximity-type reed switch identified by the reference numeral 21. The read switches 21 are mounted in a spaced-relationship with its associated key, the switch being mounted immediately adjacent the key. The relationship of the magnet 20 and its associated reed switch 21 is such that when the key is in its normal position the magnetic flux emanating from the magnet 20 does not affect the normal open circuit condition of the reed switch 21. However, with the depression of the associated key, the magnet 20 moves towards the reed switch 21 and the flux extending outwardly therefrom causes the switch 21 to respond to this magnetic field and cause it to close its contacts for signalling the operation of the associated key. With the key assuming its normal position, once again, the reed switch 21 is no longer in the path of the magnetic flux emanating from the horseshoe magnet and will assume its normal open circuit condition. The reed switches 21 are mounted on a printed circuit card and each appropriately connected with lead wires and arranged into the cable 14 and connected to the correct pins of the connector 15.

In addition to the electrical signals generated by the input device 10 for entering data into the associated system there is also generated substantially simultaneously with the operation of the data keys a timing signal. The timing signals are generated in a different fashion in accordance with whether the numerical keys 0—9 are operated or the machine function keys are operated. The structure for generating the timing signals for the numerical keys 0—9 will first be examined.

In the conventional adding machine there is provided a pin carriage which is movable in response to the operation of each of the numerical keys 0—9. Stated differently, the pin carriage essentially indexes one position to the left after each operated key is released. The pin carriage normally mounts a carriage index indicator which is identified by the reference numeral 23. The carriage index indicator 23 is provided with a plurality of rectangular spaced-apart apertures $23^a$. The apertures $23^a$ are longitudinally arranged on the index indicator 23 in a a preselected spaced-apart relationship. The index indicator 23 is employed with an optical system for signalling the carriage movement and thereby providing the desired timing signal. The optical system for this purpose comprises a light source shown as the lamp 24 mounted on the apertured panel with the lampholder $24^a$ holding it in a position as illustrated in FIG. 4, over the indicator 23. A photocell 25 is mounted on the opposite side of the indicator 23. The relative arrangement of the indicator 23, light source 24 and photocell 25 is such that the apertures $23^a$ of the indicator 23 are spaced out of alignment to the path of the light rays from the light source 24 to the photocell 25 when the carriage is in a stationary position. Accordingly, the photocell 25 is normally maintained in a dark condition and no signal is derived therefrom. The spacing of the apertures $23^a$ is such that with the indexing or movement of the carriage to the left in response to the release of an operated key the apertures $23^a$ are moved into the path of the light rays from the light source 24 to cause them to impinge on the photocell 25 and to activate the photocell for producing an output signal therefrom. With the completion of the travel of the carriage, the apertures $23^a$ previously in alignment with the light source 24 and the photocell 25 are moved out of alignment and the photocell 25 returns to its dark condition.

The timing signals for the motor bar keys, namely, the keys identified as the +, −, T, S and N keys are generated through the conventional machine cycle cam employed in the machine 10. The machine cycle cam 30 is best illustrated in FIG. 5. For the purposes of generating the machine cycle timing signal the cam is associated with an electromechanical switch illustrated as the switch 31. Unlike the numerical keys, the machine cycle keys are connected to ground through the machine cycle switch 31 after it is operated. This causes both the data and timing signal to be transferred into the system at about the same time. The machine cycle cam 30 is arranged with a tripping lever 32 (in the conventional machine) so that in response to the operation of a machine cycle key the cam 30 will rotate in a clockwise direction causing the tripping arm 32 to move in a clockwise direction towards the actuating arm $31^a$ for the switch 31. At an interval towards the end of a complete revolution of the machine cycle cam 30, the tripping arm 32 will engage the arm $31^a$ and operate the switch 31 for causing an electrical signal to be provided therefrom. This operation then will be effected each time one of the machine cycle keys is depressed.

Another important feature of the input device 10 is the arrangement for locking out the machine in the event an error is detected due to the machine operator keying two keys at the same time or an error has been detected in the associated electronic system. The details of the electrical circuitry for detecting errors will be described in more detail hereinafter. For a more detailed explanation of the input device, reference is to be had to the copending application entitled INPUT DEVICE having Ser. No. 724,978 and assigned to the same assignee as the present invention and which additional disclosure is incorporated herein by reference.

Figure 6A:
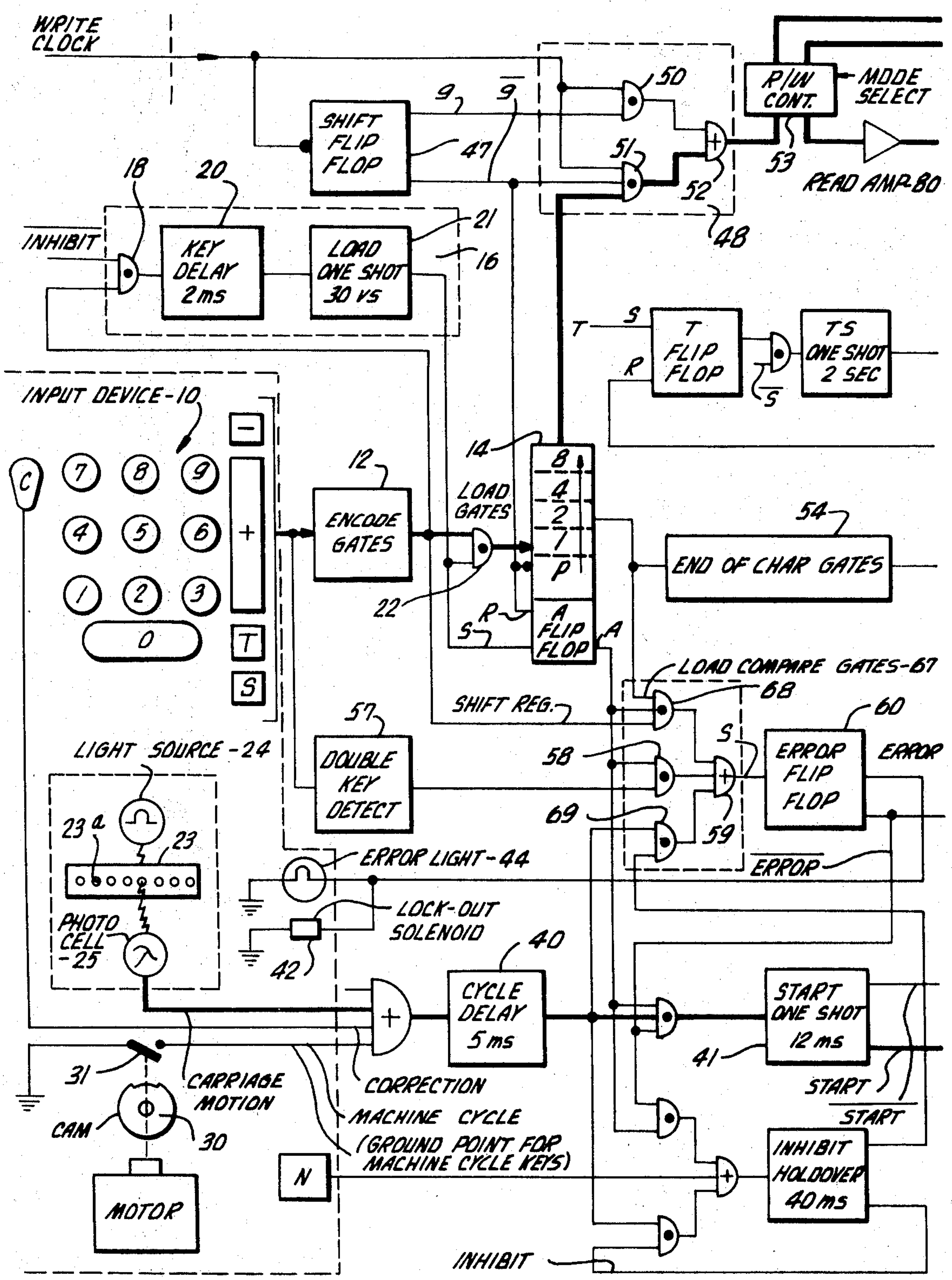
FIG. 6 is an illustration of the combination of FIGS. 6A and 6B to form the logical flow diagram of the system of the present invention.
Figure 6B:
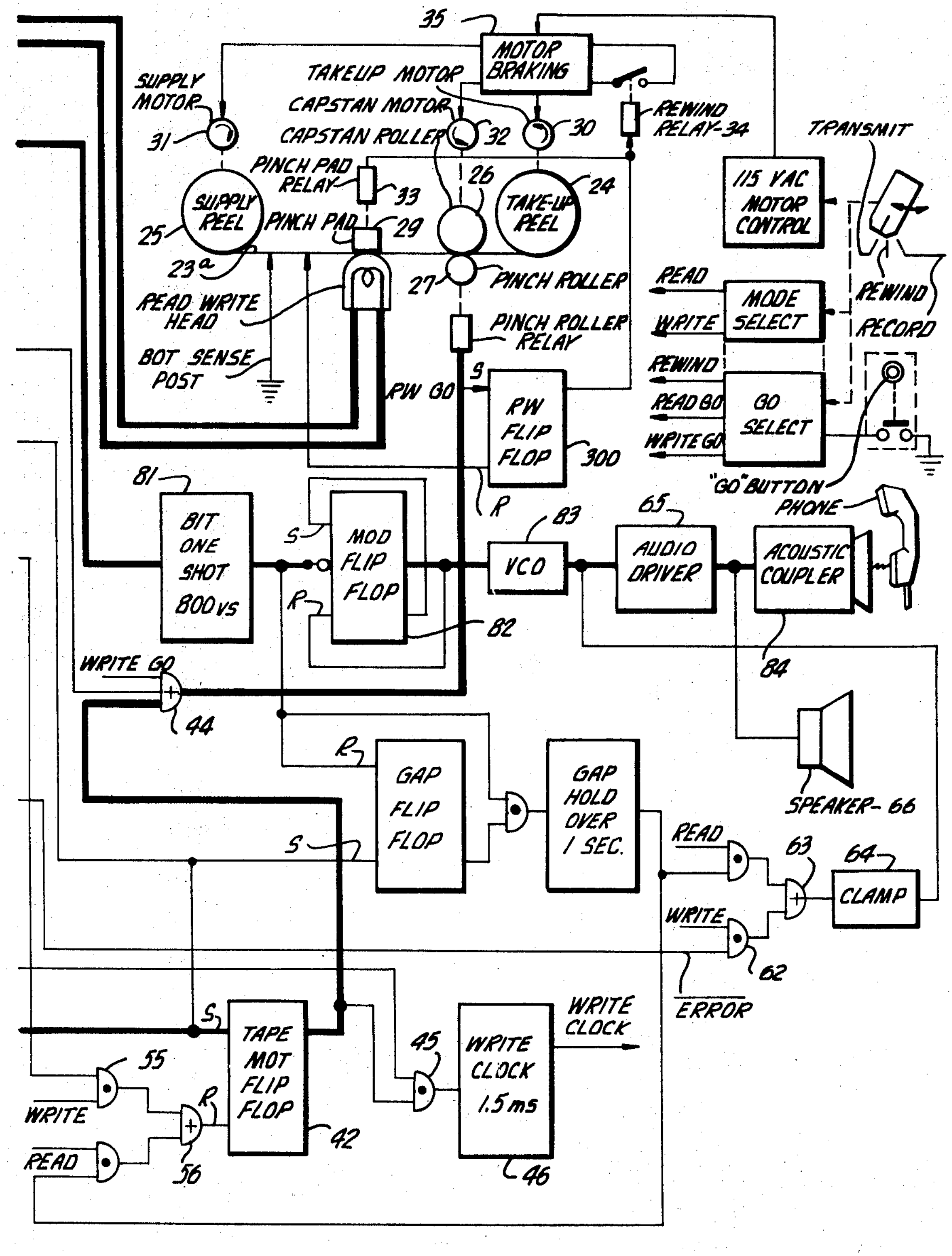

Now referring to FIGS. 6A and 6B the logic flow diagram of the recording and transmitting features of the electronic ordering system will be examined. As is evident from the above description the input device for the system is the modified conventional adding machine and which input device 10 is diagrammatically illustrated in terms of its keyboard as it is used in the present system. As the device is diagrammatically illustrated in FIG. 6A the keyboard is merely shown with the data keys and the machine cycle keys. These signals are, of course, generated by means of the magnetic reed switches 21 described hereinabove. The timing signals, however, and the generation thereof are diagrammatically illustrated for the three types of keys employed with the adding machine carrying the data keys 0—9 and the machine cycle keys which are identified as the keys +, −, T, S, and N. Also the clear key identified as the C key is illustrated. For the purposes of entering information into the system, the decimal digits 0—15 may be entered or recorded by means of the of the usual numerical keys for identifying the decimal digits 0—9 as is conventional. The T key is assigned to represent the decimal digit 10, while the "+" key represents the digit 11, the N key 12, the "−" (minus) key 13, the S key 14, with the C key representing 15. With the operation of any one of these keys then a signal is generated for entry of the corresponding data into the system. Associated with each of these keys is the schematic illustration of the timing arrangement therefor with the exception of the switch for generating the timing signal for the clear key C, which is more particularly described in the aforementioned copending application referenced hereinabove. The numerical keys 0—9 are illustrated associated with the modified carriage motion index indicator 23 which includes the plurality of light transmitting apertures $23^a$ and the light source and a photocell for providing the timing signal upon operation of each of the numerical keys 0—9. In the same fashion the timing signal for the machine cycle keys are diagrammatically illustrated as they are generated.

The writing or recording of the information entered into the system by means of the input device 10 is essentially effected in two phases. The first phase of the recording operation involves the entering of the data into a temporary storage register and is effected with the operation of a key on the input device 10. After the information is correctly entered into a temporary storage register, it is then automatically transferred along with the timing signals onto the storage medium or the magnetic tape system in this instance. The system is adapted to effect this necessary writing or recording of information depending upon the type of key that is employed. Stated differently, the recording operations are effected in one way when the keys 0—9 are operated, while a slightly different system is employed for the machine cycle keys and a third system for the clear key. In each instance, however, the signal generated by operation of one of the adding machine keys irrespective of the decimal digit to be entered into the system or any other information to which the key is assigned a value is applied at the input to the encoding gates 12. The encoding gates 12 accept the signals from the input device 10 and encode it into a preselected binary coded group of signals.

In the present instance, the numerical data for the digits 0—15 in accordance with the aforementioned assignments of the values for the adding machine keys are encoded into a well-known binary coded decimal system employing the 8-4-a'-1 notation. The encoding gates 12 also provide a parity bit employed for error checking purposes. These binary coded decimal signals are entered in accordance with the first phase of the writing or recording procedure into a temporary storage register identified as the shift register 14. The binary coded decimal signals are shifted into the shift register 14 in a parallel circuit relationship along with the parity bit and shifted out of one end of the register 14 in a serial fashion. The transfer of information into the shift register 14 is under the control of a load clock 16. The load clock 16 comprises an AND circuit 18, a key delay circuit 20 and a load one-shot multivibrator 21. The output signals from the load one-shot multivibrator are identified as the load clock signals are coupled to the load gating network 22 in combination with the encoded signals from the encoding gates 12. Accordingly, with the delivery of a load clock signal to the load gates 22 the binary coded decimal bits are loaded into the shift register 14. It should be appreciated that each loading operation is effected with the operation or depression of a key on the adding machine or input device 10. It does not require a release of a key to effect this entry of data into the shift register 14. In fact the release of the data keys 0—9 is necessary to generate the associated timing signal by means of the movement of the carriage motion indexer to effect the transfer of the information entered into the shift register 14 onto the storage medium.

The storage medium for the recording system is a conventional magnetic tape system adapted for reel to reel operation. The magnetic tape system is generally identified by the reference numeral 23 and is shown with a takeup reel 24 and a supply reel 25. Arranged intermediate the takeup reel and supply reels 24 and 25, respectively, reading from right to left in FIG. 6B, is illustrated a capstan roller 26 on one side of the tape $23^a$ with a pinch roller 27 on the other side of the tape arranged to the left of the takeup reel 24. Upstream from the capstan roller 26 and pinch roller 27 is arranged the magnetic transducer shown as a read-write head 28. The read-write head 28 is arranged on the same side of the magnetic tape $23^a$ as the pinch roller 27 and is associated with a pinch pad 29 arranged on the opposite side of the magnetic tape. As is conventional, the takeup reel 24 and the supply reel 25 are provided with individual drives identified as the takeup motor 30 and supply motor 31. The capstan roller 26 is provided with the usual precision capstan motor 32. The pinch pad 29 is moved into and out of engatement with the tape $23^a$ opposite the transducer 28 by means of a pinch pad relay 33 along with the other conventional control circuitry. In particular the pinch pad relay 33 is actuated in conjunction with the rewind relay 34 employed for rewinding the tape from the takeup reel 24 to the supply reel 25. The actuation of the rewind relay 34 and the control of the braking of the motors 30, 31 and 32 is by conventional braking means and is shown as a motor braking box 35. The pinch roller 27 is normally mounted spaced from the magnetic tape and the capstan roller 26. The actuation of the pinch roller 27 to place it in frictional engagement with the roller 26 for advancing the tape from the supply reel 25 in a conventional fashion is under the control of the associated electronic circuitry for writing the desired information onto the tape as will be more evident hereinafter.

The transfer of information from the shift register 14 onto the magnetic tape $23^a$ is under the control of the timing signals generated by the photocell arrangement described herein for the data keys 0—9. This photocell signal controls the cycle delay element 40 which provides a delay in response to the reception of a photocell signal of at least 5 milliseconds This cycle delay signal is effective for triggering the element 41 identified as the start one-shot element. The start one-shot element 41 normally signals the $\overline{\text{start}}$ condition.

Figure 9:
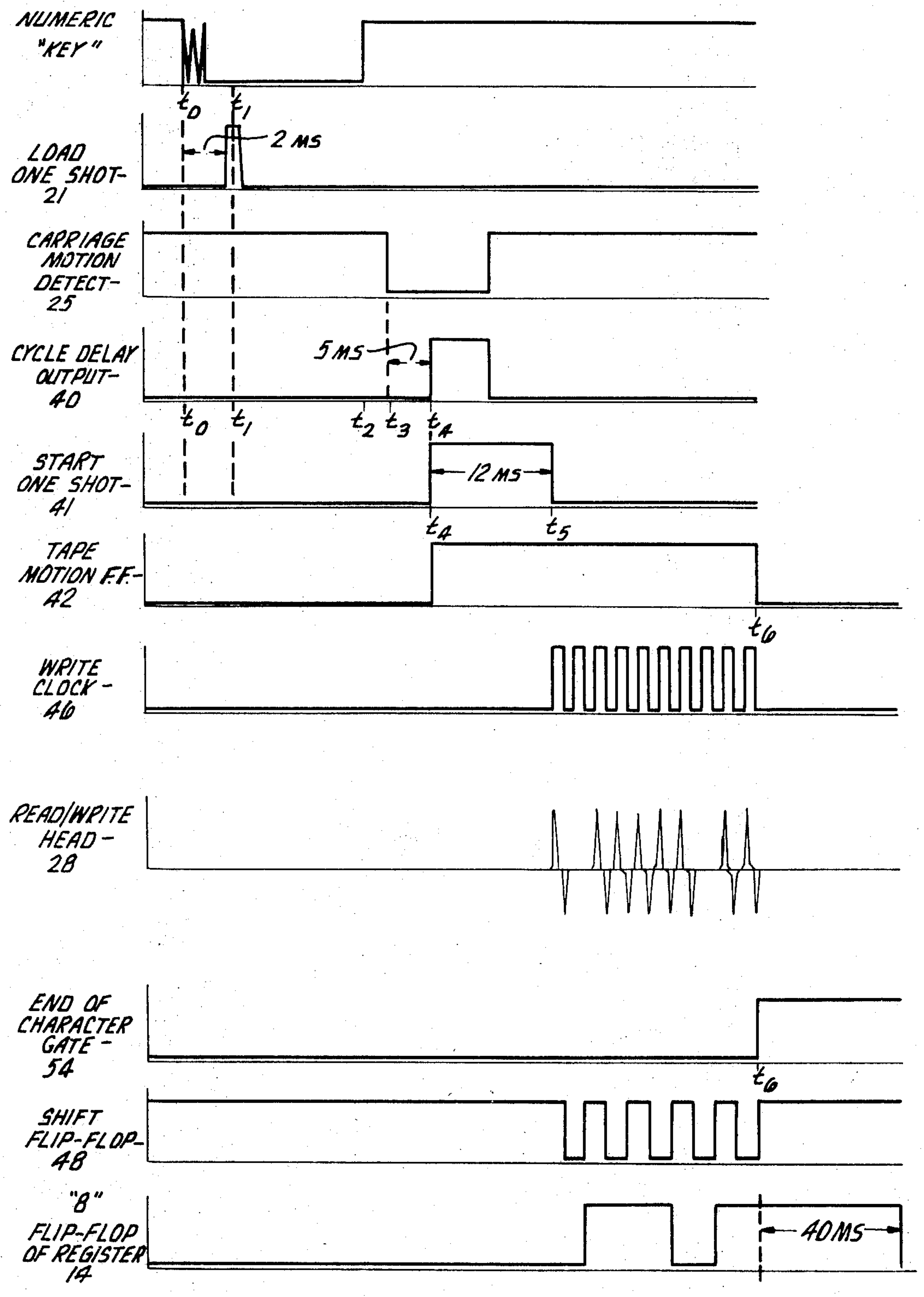
FIG. 9 is a timing diagram for recording information by means of the numerical keys of the input device of FIGS. 1 and 3.

With the reception of the signal from the cycle delay element 40 at the start one-shot 41, it is immediately switched to signal the start condition, or its other state. The start signal is applied directly to the tape motion flip-flop 42 to place it in its "set" condition and in this state is effective for starting the movement of tape $23^a$. The set output for the tape motion flip-flop 42 effects the tape motion by means of the set signal applied to the pinch roller relay 43 through the OR circuit 44 connected intermediate the two. The pinch roller relay 43 moves the pinch roller 27 into engagement with the capstan roller 26 which causes the tape to advance from the supply reel 23 to the takeup reel 24. The start one-shot element 41 has a timing cycle of approximately 12 milliseconds after which it switches back to its normal $\overline{\text{start}}$ condition. With the timing out of the start one-shot element 41 and its switching to the $\overline{\text{start}}$ condition, the latter signal will be applied to the AND gate 45 employed to control the write clock generator 46. The AND gate 45 is responsive to the $\overline{\text{start}}$ signal and the set signal from the tape motion flip-flop 42. Since the tape motion flip-flop 42 had previously been placed in its set condition, with the arrival of the $\overline{\text{start}}$ signal at the AND gate 45, the write clock generator 46 is activated. The write clock generator 46 is an oscillator having two half cycles of about 0.8 milliseconds duration each, as best illustrated in FIG. 9. On the first half cycle, the write clock pulse causes a positive pulse to be written onto the tape and a negative pulse is written on the second half cycle.

These write clock signals are employed for transferring the information from the shift register 14 onto the magnetic tape $23^a$. For this purpose a shift flip-flop 47 is coupled to be responsive to the write clock signals form the generator 46. The shift flip-flop 47 is preferably a complementing flip-flop so that it will shift states with the reception of each clock signal from the generator 46. One of the outputs, the output on the lead wire 9 for the shift flip-flop 47 is coupled to the shift register 14 for serially shifting the information from one end to the other end, from the bottom end to the top end as illustrated in FIG. 6A. Accordingly, the information stored in the 8-bit position of the shift register 14 is shifted out of the register with the reception of a pulse from the shift flip-flop 47. The output signals from the shift flip-flop 47 are also employed with the write logic control network 48 for actuating the read-write head 28 for writing the information shifted out of the register 14 onto the magnetic tape along with the write signals.

The writing system is arranged so that the information is recorded on the magnetic tape $23^a$ in a single track with each binary bit of information recorded with an associated write clock signal so that the single track of information alternately records a clock signal and a binary bit of information in accordance with the various values of the binary bits shifted out of the register 14. For this purpose the write logic control network 48 comprises a pair of AND circuits 50 and 51 each responsive to the write clock signal in combination with an output signal from the shift flip-flop 47. The AND gate 50 is connected to be responsive to the signal from the shift flip-flop 47 on the lead wire identified as a 9 output signal, while and AND gauge 51 is responsive to the signal on the lead wire identified as a $\overline{9}$. The AND gate 51 is also connected to be responsive to the binary bit 1 shifted out from the 8 position of the shift register 14. The output circuits from the AND gates 50 and 51 are connected as input circuits for the OR gate 52. The output of the OR gate 42 is in turn coupled to the read-write control network 53 for controlling the energization of the read-write head 28.

The operation of the write logic control network 48 in response to the clock signals is such that with the reception of a write clock signal, during the first phase of the clock signal it appears at the AND gate 50 along with the signal from the 9 lead wire of the flip-flop 47 to effect the writing of the clock signal onto the magnetic tape $23^a$. During the later phase of the same clock signal, the flip-flop 47 is switched in response thereto thereby causing it to shift states and be in condition to shift out the binary bits from the register 14 to then cause the input condition of the AND gate 51 to be satisfied. With these logic conditions having been met the bit shifted from the register 14 is then written onto the magnetic tape. The write clock signal is effective for writing a positive pulse on the magnetic tape during the first half cycle of a clock pulse and the second half cycle writes a negative pulse. The writing of a positive pulse on the magnetic tape occurs when the write clock is in its first half cycle and the shift flip-flop 47 signals the "no shift" condition or the lead wire 9 signals TRUE or when the write clock is in the first half cycle and the data in the 8 cell of the shift register 14 represents a binary 1. Under all other conditions a negative level is written on the magnetic tape. With the alternate application of a shift pulse to the shift register 14 the signals stored therein are shifted out of the end of the register 14 and are recorded on the magnetic tape $23^a$.

At this point it should be noticed that with the transfer of the information into a shift register the information recorded therein includes not only the desired data and the parity signal but also a 1 is written into the extreme end of the shift register 14, in the cell identified as the A flip-flop. When all of the information including the parity signal is shifted out of the register 14 the 1 was is previously stored in the A flip-flop will be stored in the 8 position of the register 14. At this point in time, the shift register 14 will have output signals signalling the binary information 100000. This group of binary bits will signal the end of information or the end of a character and is signalled by the end of character gate 54. When the shift register signals this condition the end of character gate 54 is placed in a true condition. This true condition is coupled to a write AND control gate 55 employed in combination with an OR circuit 66. The output signal from the OR circuit 66 is coupled to the reset input of the tape motion flip-flop 42. Since the write clock 46 is in the true condition at this time, with the arrival of the end of character signal at the AND gate 55, the tape motion flip-flop 42 is reset. The resetting of the flip-flop 42 will cause the pinch roller 27 to be withdrawn away from the tape 23$^a$ and thereby stopping the advancement of the tape and also will be effective for turning off the write clock generator 46. No further signals will be recorded on the magnetic tape until a new group of bits are written into the shift register 14 and the tape is advanced another increment.

Essentially, the same general procedure results when the data is to be entered into the shift register 14 and recorded on the magnetic tape as a result of the operation of one of the machine cycle keys. When a machine cycle key is operated the information is entered into the shift register 14 after the 2 millisecond delay period. It will be recalled that the operation of a machine cycle key energizes the adding machine motor and thereby rotates the cam 30 that operates the machine cycle timing switch 31. When the machine cycle timing switch is operated by its associated cam the keyed information is entered into the shift register 14. The transfer of the information appearing at the output of the encoder gates 12 is shifted into the register 14 through the provision of the load clock signal at the load gate 22. The remaining operation relative to the machine cycle key is similar to that described for the keys 0-—9.

Figure 11:
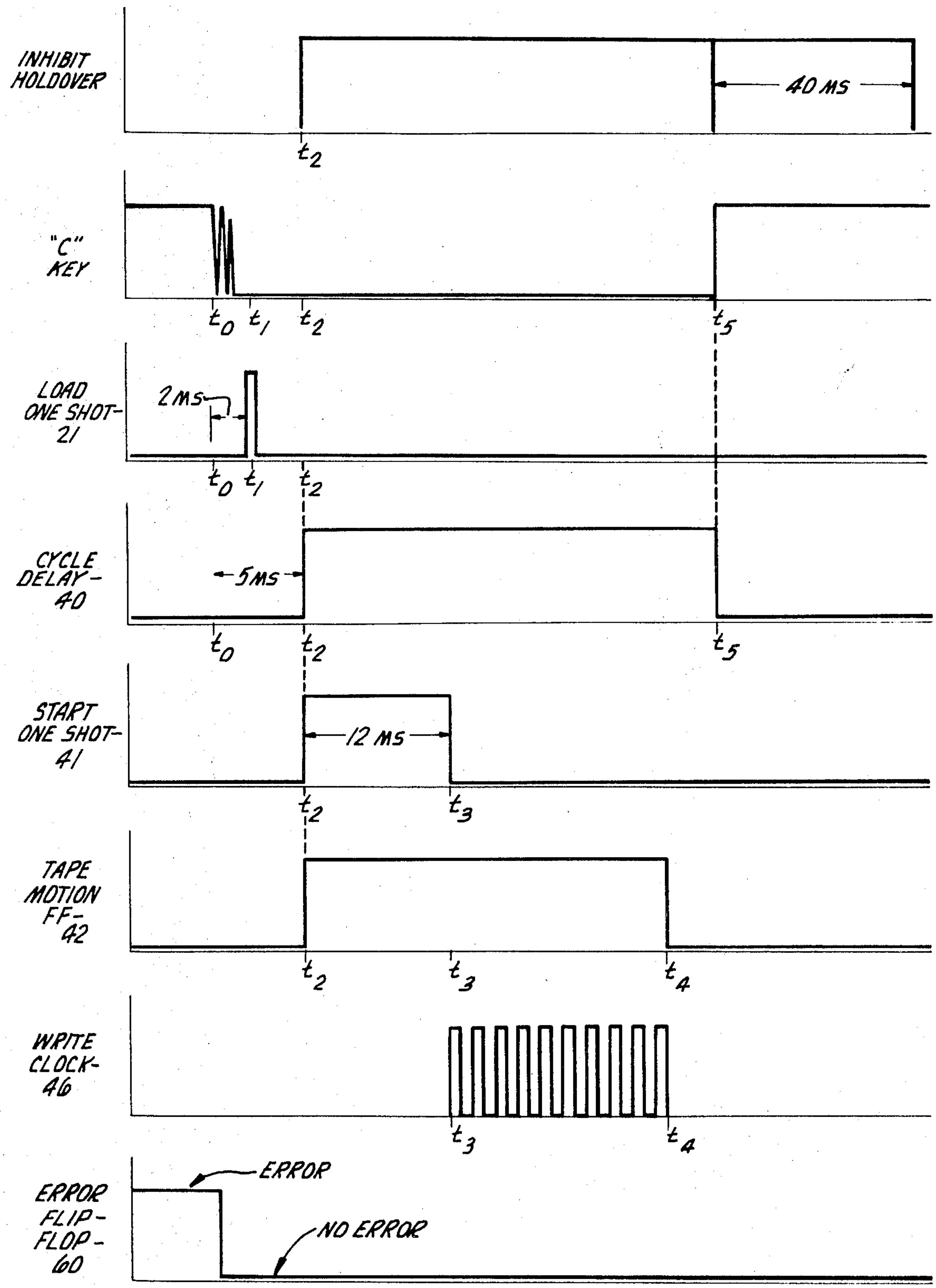
FIG. 11 is a timing diagram for recording information by means of the C key of the input device of FIGS. 1 and 3.

The remaining key to be considered is the C or clear key. With the operation of the C key to its extreme end it actuates the switch for generating the timing signal. The operation of this key then supplies the data signal and the clock signal at the same time and therefore starts the recording of the shift register 1 in its timing sequence as described hereinabove. This timing sequence for the C key is illustrated in FIG. 11.

As mentioned hereinabove, an important aspect of the present invention is the ability to signal the errors of the operator and equipment errors or failures. The operator errors include errors wherein two keys are depressed simultaneously or an equivalent condition. This double keying error is detected by the double key detect gate 57 that is connected to be responsive to all of the signals generated by means of the reed switches from the input device 10. The output signal from the double key detect gate 57 is coupled to an AND circuit 58 in combination with the output signal from the A flip-flop of the shift register 14. This signal is true when information has been shifted into the shift register 14 and prior to writing on the magnetic tape. The output signal from the AND circuit 58 is coupled to an OR circuit 59 which has its output circuit connected to set input of the error flip-flop 60. Accordingly, it should be evident that with the detection of a double keying operation by the operator the error flip-flop 60 will be set. The set output of the error flip-flop 60 will cause the error light 44 arranged on the input device 10 to be energized and thereby give a visual detection of an error to the operator. At this same time the lockout solenoid 42 is energized depending upon the conductive condition of its associated switch. The detection of such an error may also be audibly signalled by means of the generation of a tone. For this purpose the "set" output of the error flip-flop 60 is coupled to an AND gate 62 in combination with a write signal. The AND gate 62 has its output circuit connected to an OR circuit 63 which in turn controls a clamp circuit 64. The clamp circuit 64 is normally arranged to inhibit the output of VCO 83 to cut off the audiodriver 65 from the system. The audiodriver 65 is connected to a speaker 66 so that the operator may hear the audio tones. With the detection of an error, the clamp circuit 64 releases the VCO output 83 so that a steady tone or a tone of a single frequency results from the speaker 66.

The system errors which may result from a multiplicity of system failures are also detected by the present invention to prevent erroneous information from being transferred onto the magnetic tape. This type of error is signalled by the load compare gates generally identified by the reference numeral 67. The load compare gates 67 generally compare the information to be stored in the shift register 14 with the information actually stored in the register 14. The load compare gate 68 is conditioned to be responsive to the output signals from the shift register 14 representative of the information stored therein in combination with the signals form the encoding gates 12 and the state of the A flip-flop of the shift register 14. If the conditions of these input signals are all true the output signal of the AND circuit 68 will be provided to OR gate 59 to trigger the error flip-flop 60 to the "set" condition. The setting of the error flip-flop 60 will effect the same operations as previously described. In the same fashion, the gate 69 senses errors if a timing signal occurs from the input device 10 without the prior occurrence of a data signal to load the shift register 14. Data signals cause the A flip-flop of shift register 14 to "set" which triggers the inhibit holdover circuit. If the inhibit holdover circuit is not conducting when the timing signal comes through cycle delay 40, gate 69 causes the error flip-flop 60 to "set." The inhibit holdover locks out any subsequent data signals once the shift register 14 is loaded. The shift register 14 is held in a "cleared" state when the inhibit holdover is nonconductive. The error flip-flop 60 causes the inhibit holdover to become nonconductive and locks it out so it cannot be retriggered. With errors, the shift register 14 is held "cleared" and the timing signals are gated from the start one-shot 41 by the error flip-flop 60. With the signalling of an error in the system, the error must be corrected before any information can be written on tape. The detection of the error locks out the adding machine keyboard and no printing of information is allowed until the error is corrected. If a double key error is the source of the error, it may be corrected by operating the clear key C in which case the error flip-flop 60 is cleared and a C is written on the tape 23$^a$ and the system is ready for reentering new data. If a system defect is present and is the source of the error, this must be corrected before the operator can continue.

Figure 12:
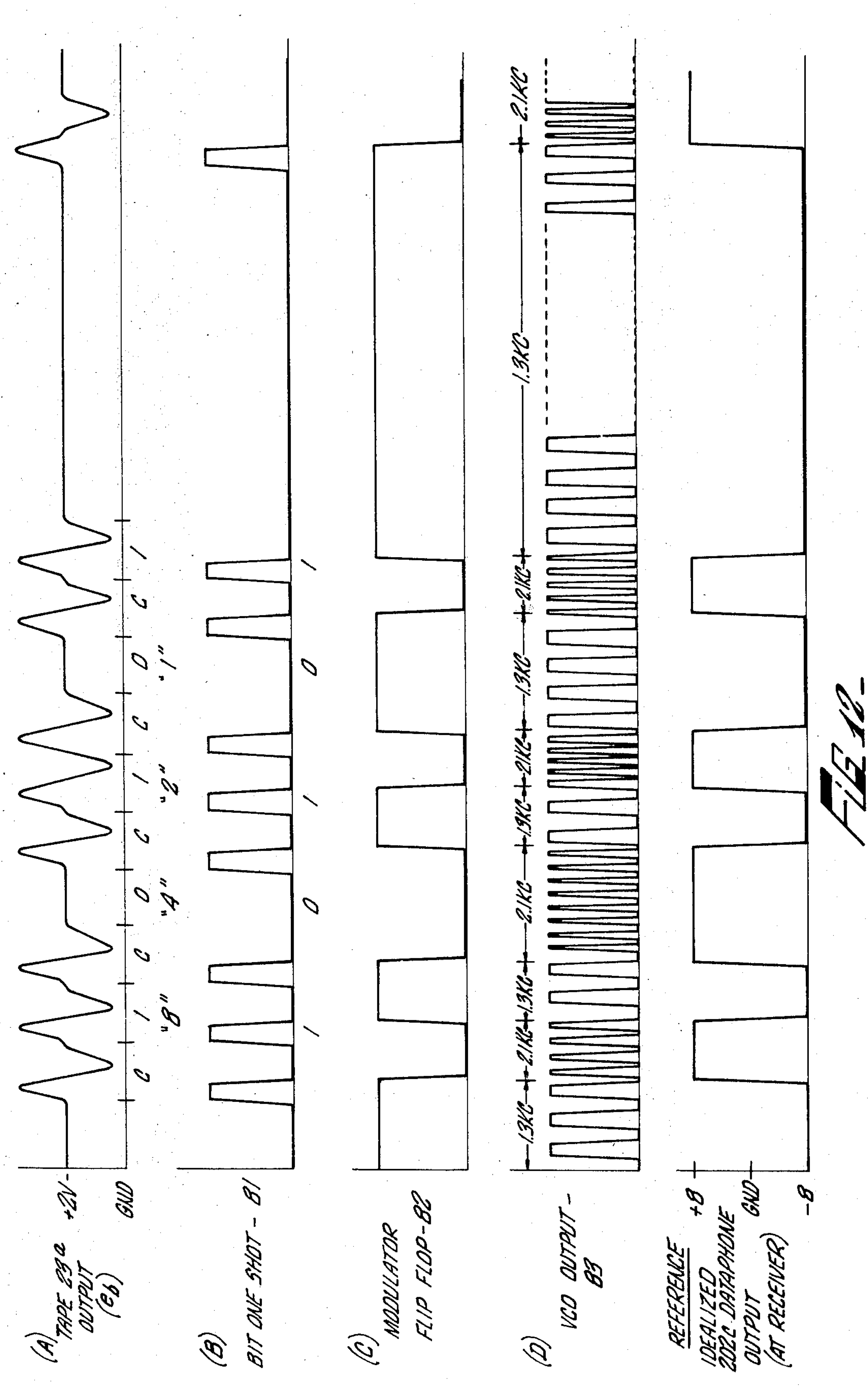
FIG. 12 is a graphical illustration of information waveforms employed in transmission of the recorded information.

The information recorded on the magnetic tape is in the form of positive and negative flux changes as illustrated in FIG. 9. The binary coded bits are represented on the magnetic tape as flux changes, or the absence of flux changes, the binary bit 1 of a timing pulse being represented by a double flux change recorded on the magnetic tape while the binary 0 is represented by no flux change. The information recorded on the tape is sensed and amplified by means of a conventional read amplifier 80 coupled to the output of the read/write control circuit 53. The read amplifier 80 in turn is coupled to a one-shot multivibrator 81 functioning merely to shape the pulses received from the read amplifier. The one-shot element 81 transforms the flux pattern as represented in FIG. 12 into a series of positive pulses representative of the clock pulses and the binary bits associated with each clock pulse. The pulses then from the one-shot element 81 are applied to a complementing flip-flop 82. Each time that the one-shot element 81 is triggered the flip-flop element 82 is complemented or changes states. The flip-flop 82 is associated with a voltage controlled oscillator 83 which is arranged to be in a conductive condition at all times. The frequency of the output signal from the voltage control oscillator is directly dependent upon the output state or the voltage state of the flip-flop 82. The voltage control oscillator provides a continuous series of pulses having the frequency of 1.3 kilocycles or 2.1 kilocycles. When the flip-flop 82 is in the 1 state or "set" state, the oscillator 83 oscillates at the higher output frequency or at 2.1 kilocycles. When the flip-flop 82 is in the 0 state or is reset the oscillator 83 produces a signal at the lower frequency or 1.3 kilocycles. This then produces a series of alternating audiotones at these two frequencies in accordance with the continuous pulsing of the flip-flop 82 in response to the recorded pulses. These audio output signals from the oscillator 83 are coupled to the audio driver 65 and alternating to the speaker 66 for monitoring of the recording by the operator or directly to the acoustic coupler 84 for transmission purposes. The acoustic coupler 84 comprises a speaker (not shown) mounted with a conventional telephone whereby the audiosignals produced by the oscillator 83 are coupled directly to the telephone for transmission to a distant point. It should be recognized that the two frequencies at which the voltage controlled oscillator 83 is selected to provide are controlled by the telephone company's requirements. The information transmitted by means of the telephone lines then is received at some distant point such as a warehouse. At this remote point the audiotones derived from a Dataphone are coded back into the binary coded decimal digits and processed by means of a computer for printing out the correct order as transmitted by the present invention.

Now referring to FIGS. 7A—7D the detailed circuits in accordance with the system block diagram of FIGS. 6A and 6B will be described. Each reed switch mounted on the input device 10 is connected to a source of potential and is normally at a +5 volt level when the switch is in an open circuit condition. The +5 volt level appears on the lead wire 101. When the reed switch is operated or in a closed circuit condition the lead wire 101 is at ground potential. This ground level is considered to be the FALSE state for the purposes of the logic of the system, while the positive voltage level is considered the TRUE condition. Each of the lead wires 101 are connected to individual resistors 100 and have their opposite ends connected in common by means of a lead wire 102 to the double key detect circuit 57. Accordingly, the signal derived from the input device 10 presents a positive voltage level to the encoding gates 12 except when a key is operated for entering data into the system. The encoding gates 12 function to accept the signal from the associated reed switch and to encode the signal into the binary coded decimal signal in terms of the 8–4–2–1 binary code for representing the character of the actuated key which may be a numerical value. For this purpose the individual encoding gates are constructed in terms of conventional, commercially available integrated circuits known as NAND/NOR circuits such as NOR circuit 103. The NOR circuit 103 has eight input circuits for producing the desired output signal. The logic of this circuit used as a NOR circuit is such that if any input signal is at ground level the output signal is at the +5 volt level or signals the TRUE state. The logic of the same circuit is a NOR to produce a FALSE output when all of the inputs are at the +5 volt level.

The NOR circuit 103 is associated with the flip-flop or storage cell for the 8 bit of the shift register 14. The NOR circuit 103 is connected at its input circuit to the various lead wires 101 from the input device 10 for effecting the desired logic sensing of the operation of these keys to convert the reed switch closures into the generated binary coded decimal representations of the digits for each digit requiring the 8 bit to be a 1. In the 8–4–2–1 system of notation, the coding of the decimal digits 8 through 15 require that the 8 bit be a 1 and accordingly the signals from these keys define the input signals to the NOR circuit 103. In the same fashion, the input circuits for the remaining NOR circuit are defined and can be traced in FIG. 7A. The NOR circuits for the remaining binary bits are illustrated in terms of two logic gates and are logically equivalent to the NOR circuit 103. Each of the NOR circuits 104, 105, 106 and 107 comprises a pair of four input gates enclosed within the dotted outlines identified by the respective reference numerals. One of the gates is a standard integrated circuit, a Motorola Type 833 gate, with the inverter circuit on the output thereof omitted and having its output circuit connected to a standard NAND/NOR circuit of the same commercial type as an input signal thereto. Accordingly, the NOR gate 104 can be seen to be coupled to be responsive to the signals from keys 4, 5, 6, 7 and 12, 13, 14 and 15. This gate 104, then, controls the entry of a 1 into the 4 bit cell of the shift register 14. In the same fashion the other gating circuits, enclosed within the dotted outline identified by the reference numerals 105, 106, and 107, are constructed. The gate 105 can be seen to control the entry of a 1 into the 2 cell of the shift register 14, while the gates 106 and 107 respectively control the 1 cell and the parity, P, cell of the shift register 14.

The outputs of the aforementioned gates 103—107 are each connected to a standard NAND/NOR gate illustrated as the Motorola integrated circuit 846 (including an output inverter). Each of the inputs from these latter mentioned NOR circuits are coupled to an individual NAND circuit in combination with a clock pulse identified as the load clock pulse derived from the load one-shot circuit 21. The output of these NAND circuits are connected directly to the "set" terminal of the associated flip-flop of the shift register 14. These NAND circuits are effective to "set" the controlled shift register cells to the 1 state, when a FALSE signal is coupled thereto.

The output signals from the NOR gates 103—107 are processed by means of one input NAND gating circuit having its output circuit coupled directly to a NOR circuit 110. The NOR circuit 110 has five input circuits, one for each binary bit representative of the operated key and the fifth input circuit representing the parity bit signal. The circuit 110 again may be an integrated circuit package and is provided to sense the operation of a key by means of the signals at the encoder gates 12, rather than at the input device 10. Normally, all of the inputs at the NOR gate 110 are in the true or the positive condition thereby signalling no key has been operated. Upon the operation of one of the keys the corresponding input to the NOR circuit 110 drops to ground potential level causing the output signal from the gate 110 to be in the TRUE state. This signal controls the load one-shot which initiates the entry of the binary coded bits into the shift register 14. This resulting output signal is processed by means of the key delay circuit 20 through the NAND gating element 18 for controlling the output of the load one-shot element 21 and thereby the application of the load clock pulse for transferring the information from the encoding gates 103—107 into the shift register 14.

Figure 7A:
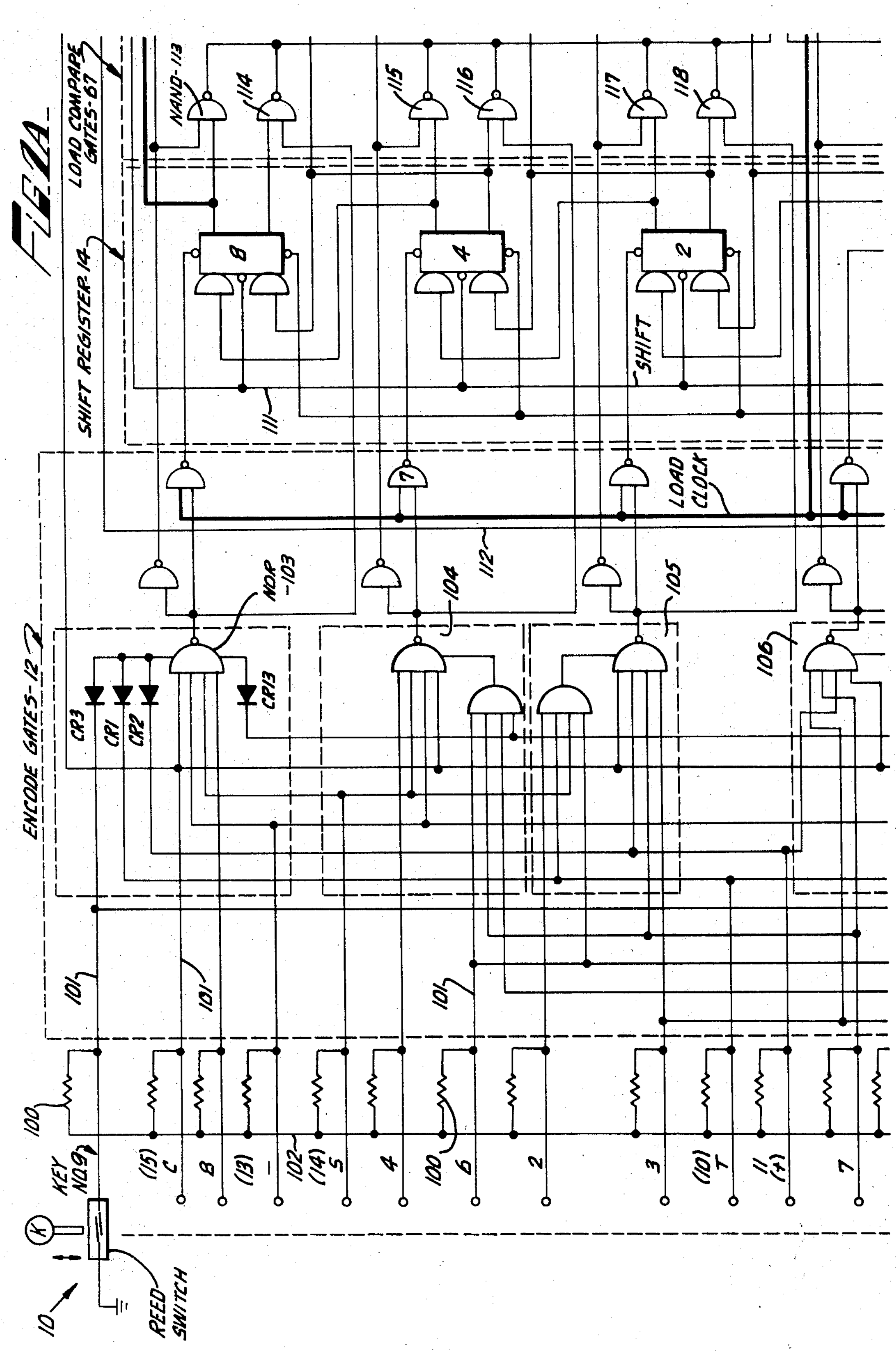
FIG. 7 is an illustration of the combination of FIGS. 7A, 7B, 7C and 7D to form the schematic wiring diagram of recording portion of the system of FIGS. 6A and 6B and the relationship of FIGS. 7C and 7D with FIG. 8.
Figure 7B:
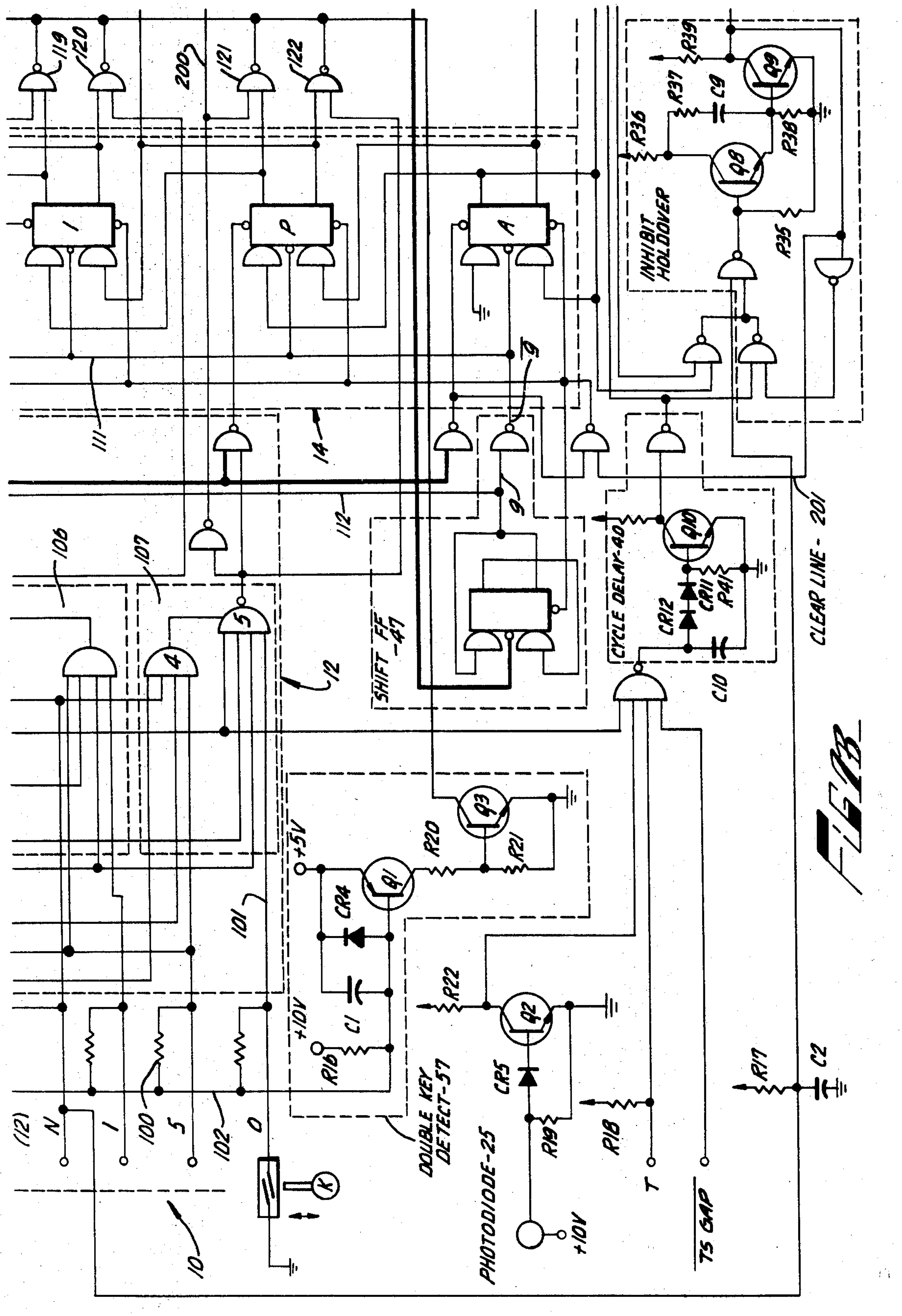

The shift register 14 is constructed as a conventional shift register having six storage cells. Four of the storage cells are employed for storing each of the 8–4–2–1 binary bits and the cell assignments read from the top to the bottom as the shift register is illustrated in FIGS. 7A and 7B. The fifth storage cell from the top or the P cell stores the parity bit, while the bottom cell or the A cell is employed for signalling the end of character or the end of a piece of information. The parity bit employed is the binary 1 to cause the total number of 1's in the five cells (8,4,2,1 and P) to be odd and is set accordingly. The bit stored in the A cell is always a binary 1. The cells of the shift register 14 preferably are constructed o integrated circuits commercially available from the Motorola company and as identified in the drawings comprise Motorola 848–P type integrated circuits. These cells for the shift register 14 include individual set and reset circuits for setting the cells in the binary 1 and the binary 0 states respectively. The load clock signals are effective through the individual NAND circuits at the set input for setting the associated cell to the 1 state. A "-clear" pulse is coupled to the reset input of the storage cells to place them in the binary 0 states. The shifting stages are constructed and function in a conventional fashion whereby the binary bit from one register may be shifted into the succeeding register upon the receipt of a shift pulse. The shift pulse is provided by means of the shift flip-flop 47. The shift flip-flop is a conventional complementing flip-flop circuit which is illustrated as an integrated circuit element of the Motorola type 848. The output signal from the shift flip-flop 47 is applied to each of the cells of the shift register cells by means of the lead wire 111 for shifting the stored binary bits from cell to cell. It should now be recognized that with the application of five shift pulses to the shift register 14 that all of the four binary bits representative of the data entered in the shift register and the parity bit will be shifted out of the register 14 at the 8-bit cell, while the binary bit 1 originally stored in the A cell will then be stored in the 8 cell. The pattern of binary bits—100000—resulting from this storage condition is detected for signalling the end of a character and that the register can be prepared for the next piece of information. This output pattern is representative of the output signals for each of these bits 8–4–2–1 and the parity bit, and the "A" bit so that when all of them are in the 0 state with the exception of the 8 bit a FALSE signal will be derived from the end of character gate 54.

As indicated hereinabove, the error checking includes the determination that the information desired to be stored in the shift register 14 is correctly stored therein and is detected by the load compare gates 67. These load compare gates comprise a series of NAND circuits having two inputs, a pair of NAND circuits for each cell of the shift register 14. One of the inputs for the NAND circuit 113 associated with the 8-bit cell of the shift register 14 is connected directly to the 1 output of the 8 cell, while the other input circuit is connected by means of the gating circuit to the output signal from the NOR circuit 103. The output signal from the NOR circuit 103 which signals that a 1 bit is to be stored in the 8-bit cell is compared in the NAND circuit 113 with the 1 output signal from the 8-bit cell. In the same fashion the NAND circuit 114 is associated with the output signal from the NOR circuit 103 and the 0 output circuit from the 8-bit cell. If the wrong binary bit is stored in the 8 cell than either the NAND circuit 113 or 114 will be at ground level, FALSE, for signalling that an error has been detected. In the same fashion the NAND circuits 115 and 116 for the 4-bit cell are constructed and arranged. Similar NAND circuits are provided for the 2-bit cell and are identified by the reference numerals 117 and 118. The NAND circuits for the 1-bit cell and parity bit cell are respectively identified by the reference characters 119, 120, 121 and 122 as illustrated in FIG. 7B. The output circuits of each of the NAND circuits 119—122 are grouped into two combinations and coupled to a NOR circuit 123. If any output signals from any of these NAND gates are at ground potential then a true signal is derived from the NOR circuit 123. This true signal is coupled to the error detecting NAND circuit 124 as one of the input conditions therefore. Accordingly, if a true output signal is coupled to the gate 124 from the gate 123 and the other two inputs to gate are simultaneously true, an output signal from the gate 124 at ground potential results so that an error is signalled. The other three inputs are the 1 output of the A flip-flop, the output of the key detect gate 110 and tape motion flip-flop 42 identified as $\overline{TM}$. These three outputs can be simultaneously TRUE only if a key is depressed, the shift register 14 is loaded and there has been no starting of the tape between $t_1$ and $t_4$ of FIG. 9, or in FIG. 10 from the time of the leading edge of the one, one-shot 21 and the time of the leading edge of the cycle delay 40, and in FIG. 11 between $t_1$ and $t_2$.

Returning now to the input signals from the input device 10, it will be recalled that the key operation will be detected through the NOR circuit 110. This detection results from coupling a signal from the encoder gates 12 for each of the bits 8–4–2–1 and parity. With the operation of a key, then a signal will be coupled to the key delay circuit 20. The key delay circuit 20 is arranged to sense a reed switch closure of at least 2 milliseconds for the purpose of assuring that any switch bounce associated with the operation of the reed switches has been timed out. After the 2 millisecond delay the one-shot multivibrator is activated and provides a clock pulse for shifting the information appearing at the load gates 12 controlling the set inputs of the cells of the shift register 14 for setting the encoded information therein.

Figure 7C:
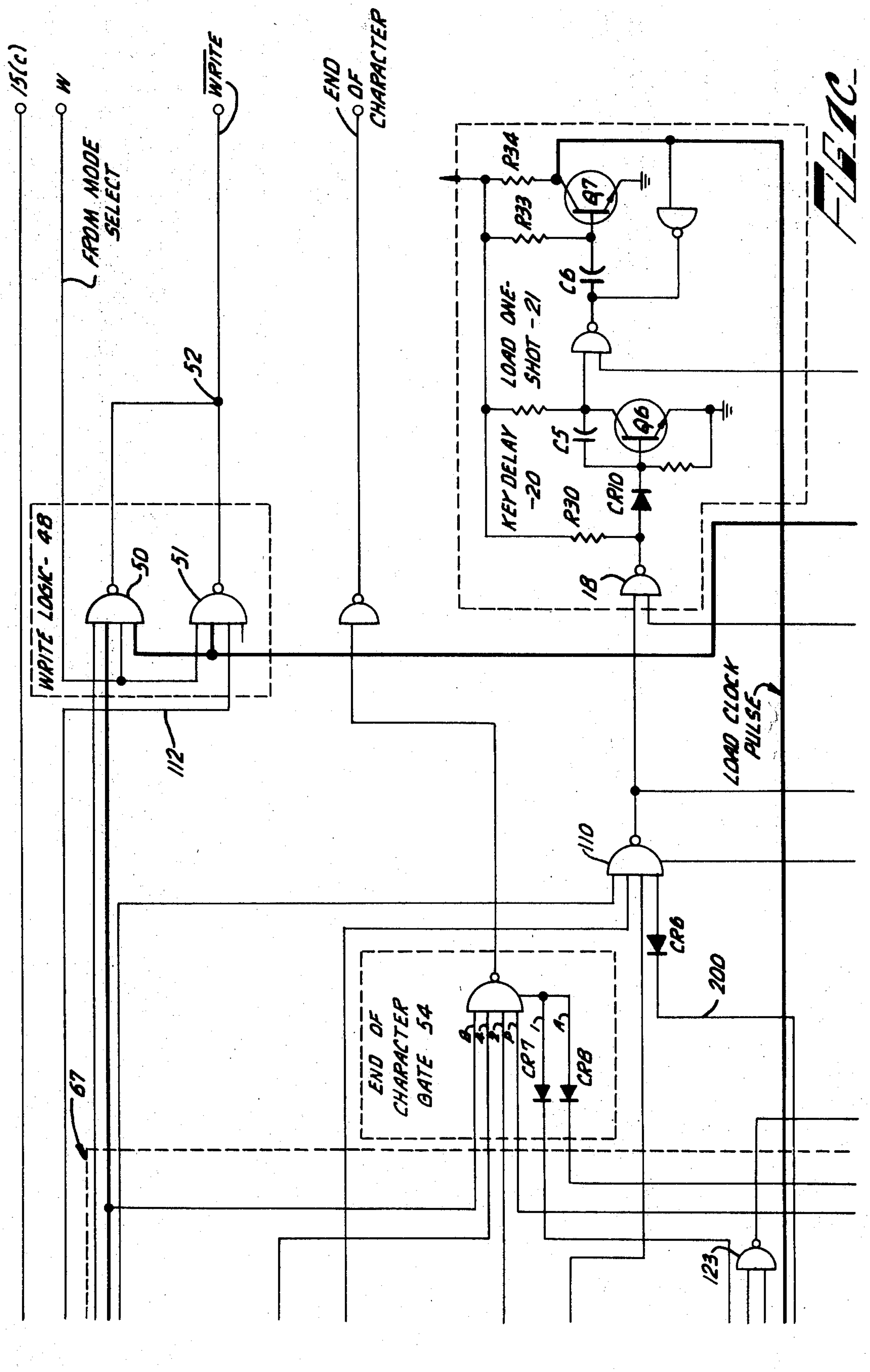
Figure 7D:
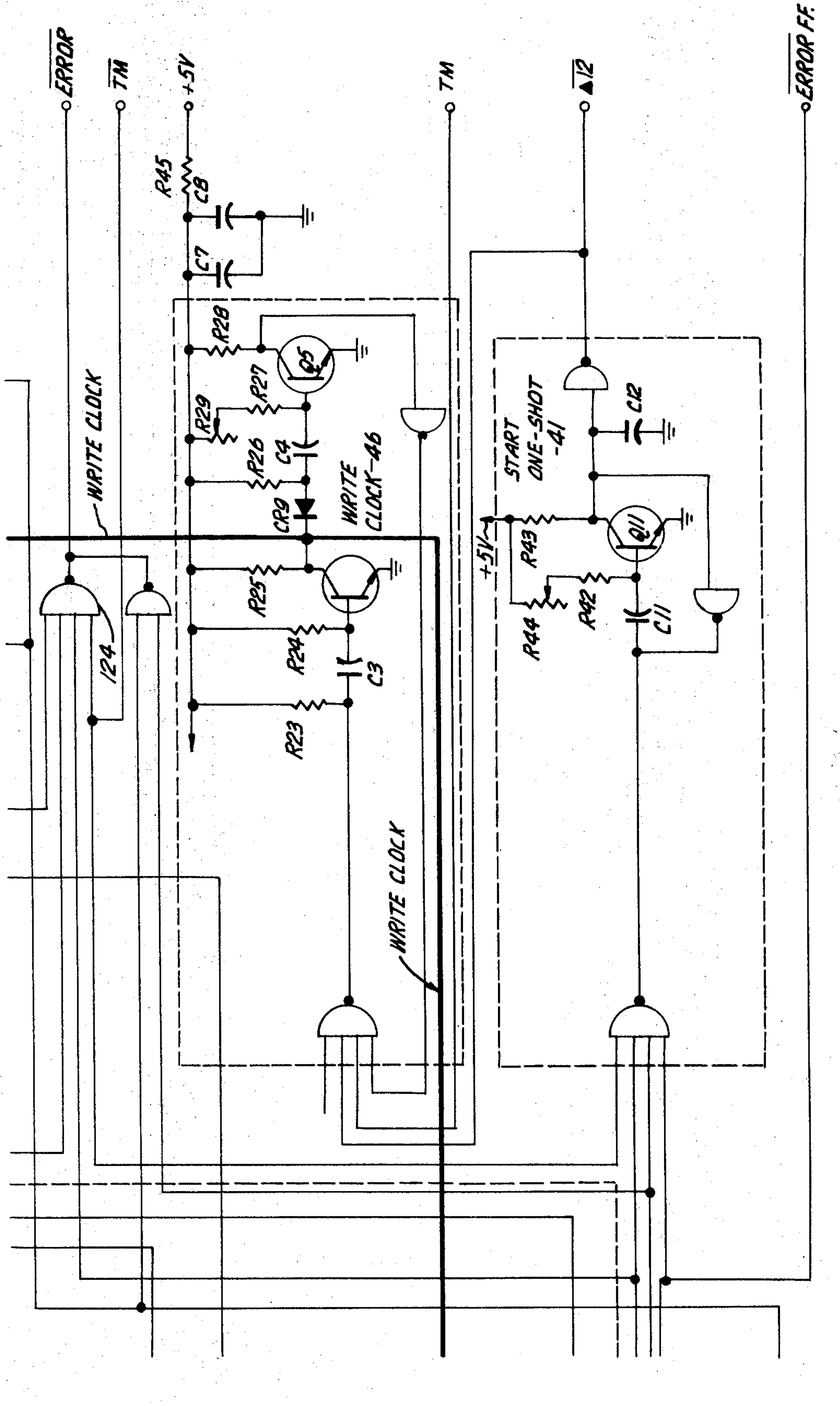
Figure 8A:
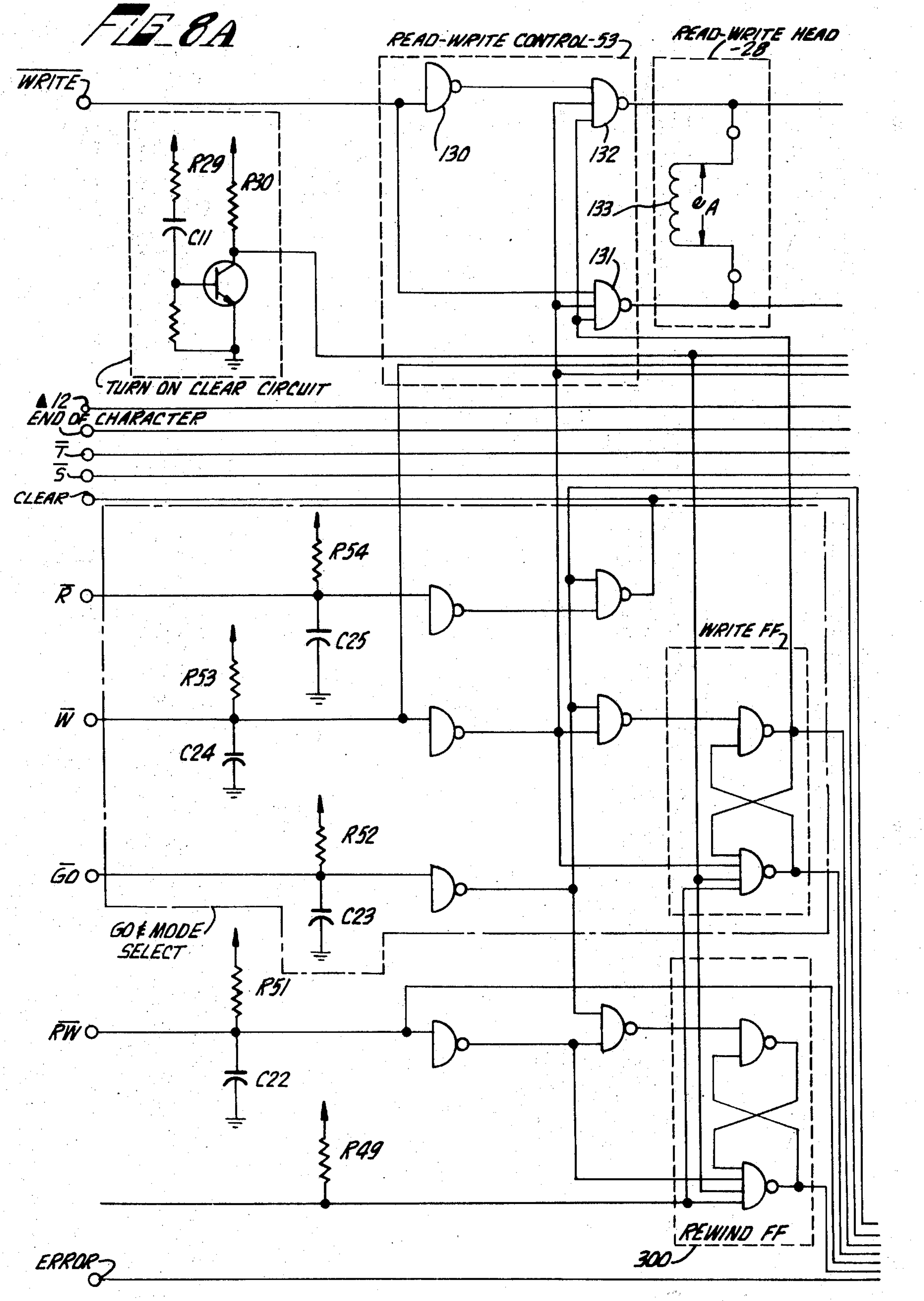
FIG. 8 is an illustration of the combination of FIGS. 8A, 8B and 8C to form the schematic wiring diagram of the controls/transmission portion of the system of FIGS. 6A and 6B and the relationship of the input signals to FIG. 8A with FIGS. 7C and 7D.
Figure 8B:
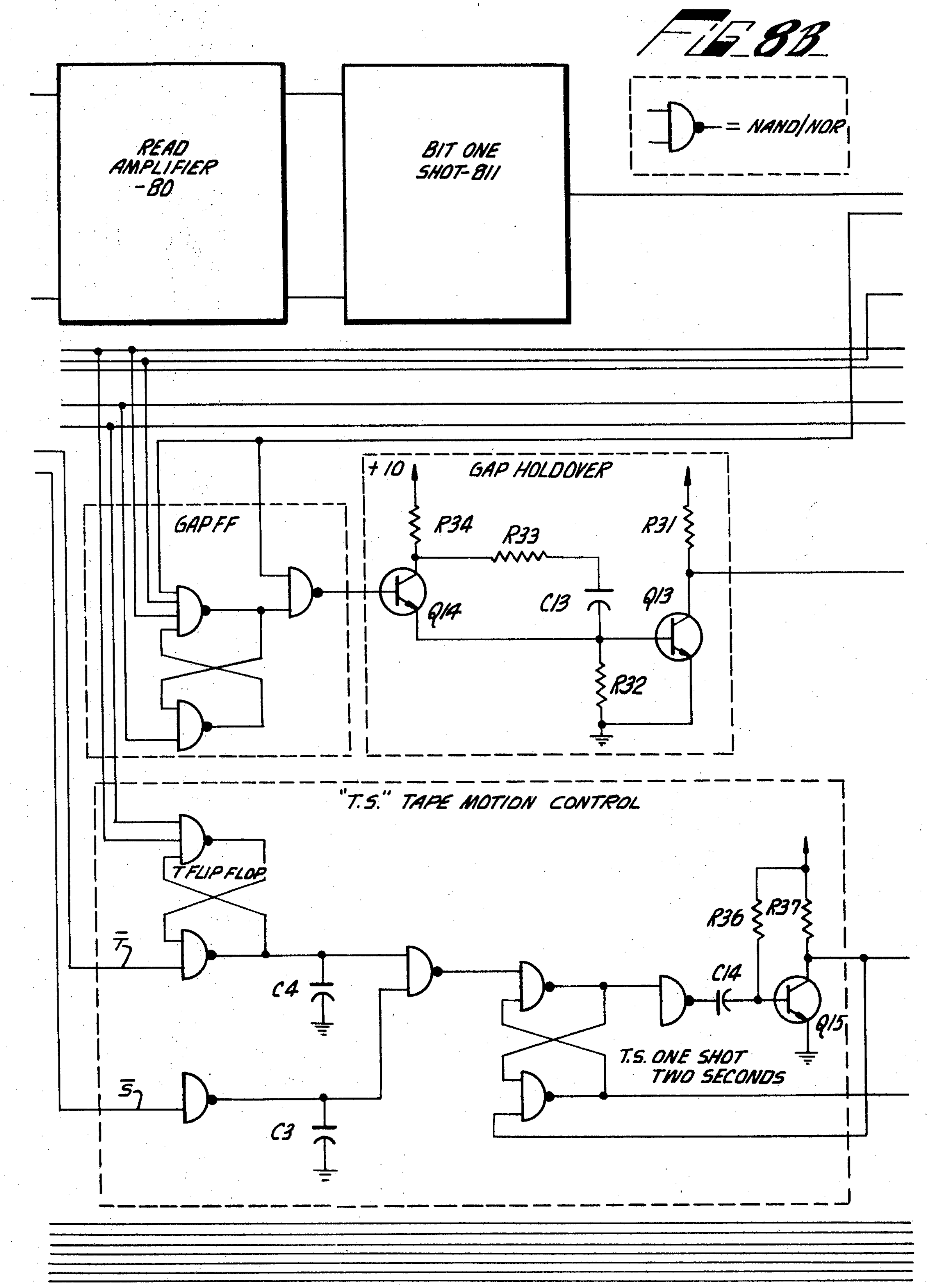
Figure 8C:
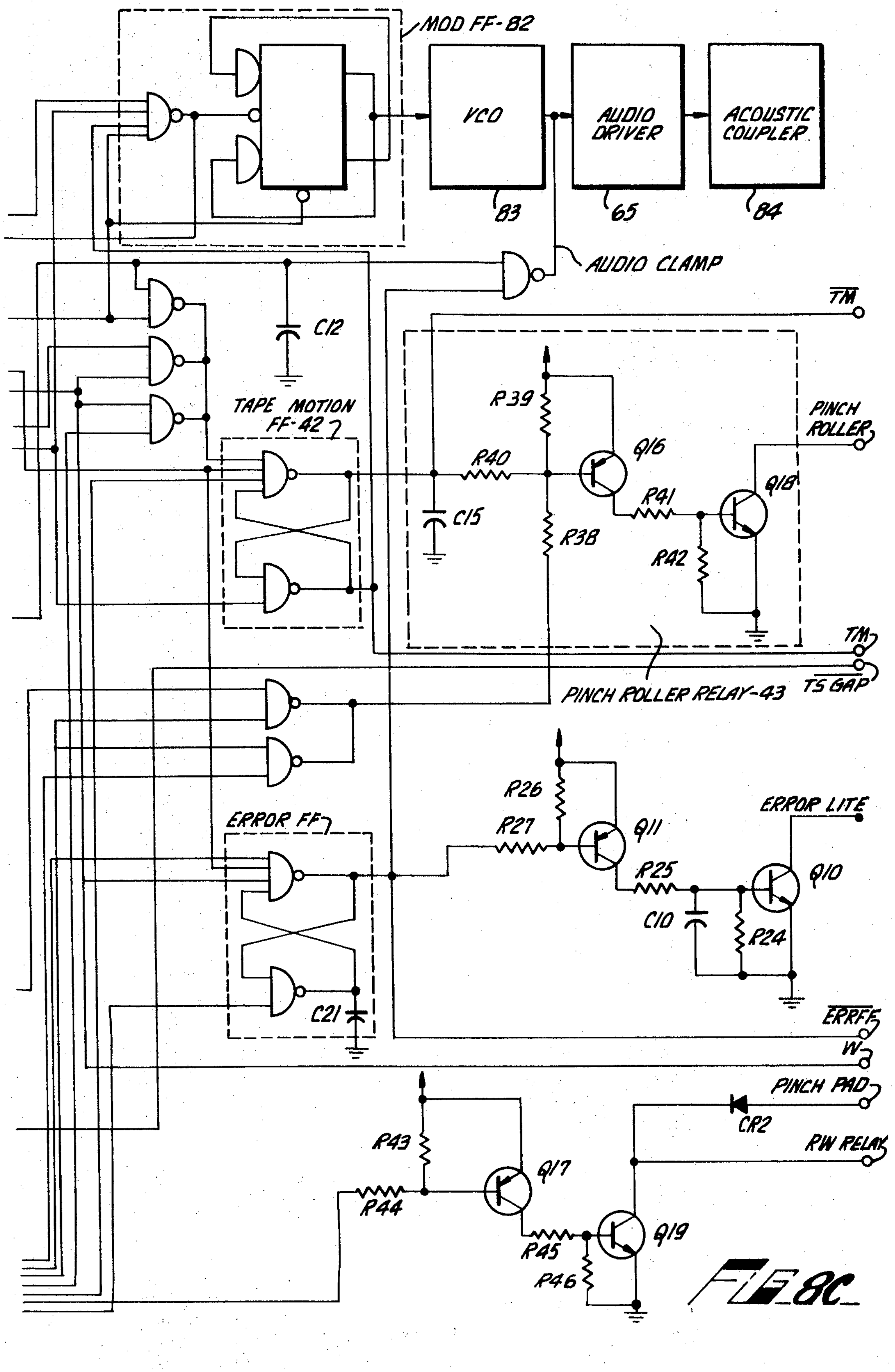

The recording or writing of the information shifted out of the shift register 14 onto the magnetic tape is by means of the write logic control circuit 48. As illustrated in FIG. 7C this circuit essentially comprises the NAND circuits 50 and 51, and the OR gate 52, illustrated as a wire OR circuit. The output of the write logic control circuit 48 is coupled to the read/write control 53 which in turn is coupled directly to the read/write head 28. The read/write control 53 is effective for controlling the direction of current flowing through the write winding 133 of the read/write head 28 for the purposes of writing information onto the magnetic tape. The signal derived form the write logic circuit 48 is identified as the $\overline{\text{write}}$ signal in FIG. 8A. The writing and other machine functions are under control of the machine made selection control knob diagrammatically illustrated in FIG. 6B. These functions are identified as transmit-rewind-write (record). In addition, a "GO" button for initiating these operations is illustrated. To effect a writing operation, for example, the control knob must be placed in the "-write" position and the "GO" button must be momentarily depressed. This $\overline{\text{write}}$ signal is applied to the read/write control circuit 53 through a single input NAND circuit 130 and to a three input NAND circuit 131. The output of NAND circuit 130 is coupled to the three input NAND gating circuit that is identified by the reference character 132. The output circuits from the gating circuits 131 and 132 are connected to the opposite ends of the write winding 133 for the read/write head 28. The logic of the system is such that when the $\overline{\text{write}}$ signal is at ground potential the current through the winding 133 flows from the gating circuit 131 towards the gating circuit 132, downwardly through the winding 133, as illustrated. If the $\overline{\text{write}}$ signal is at a +5 volt level the current flows in the opposite direction, that is from the output terminal 132 towards the output gate 131. The current flowing through the write winding 133, then, is effective for recording signals of opposite polarity on the magnetic tape in response to the switching of the current flow through the winding 133. The gates 131 and 132 are effective for writing when the output from the mode select are correct. For this purpose, the mode select control must be rotated to the "write" position. This will cause the signal $\overline{W}$ (not in write) to be at ground potential, FALSE. The one input NAND circuit coupled to be responsive to this signal will produce a TRUE signal. This TRUE signal is coupled as an input circuit to both the NAND circuits 131 and 132. The other input signal to these same NAND circuits is derived from the write flip-flop of the "GO" and mode select unit, as illustrated in FIG. 8A. A TRUE signal from this flip-flop produces the desired recording operation. The write flip-flop produces the TRUE output when GO signal goes to ground level when the GO button is momentarily operated.

The double key detect circuit 57 is arranged in the fashion of a "voting" circuit. For this purpose it will be recalled that all of the resistors 100 associated with the reed switches on the input device 101 are coupled directly as inputs to the detect circuit 57. The detect circuit 57 includes a pair of normally nonconductive transistors, illustrated as transistors Q1 and Q3 in FIG. 7B. The output signal from the double key detect 57 is derived from the collector electrode of the transistor Q3. The detect circuit 57 is proportioned so that if no key is operated or only a single key is operated the normal nonconductive conditions of the transistors are not changed. However, if two or more keys are operated at the same time, then, the circuit conditions are such that the transistors Q1 and Q3 are rendered conductive and therefore an output signal from the detect circuit 57 is provided for signalling the keying error. This error signal would be at ground level and is coupled to the NOR circuit 123.

The detection of the carriage motion when the keys 0—9 are operated results from the illumination of the photodiode as previously discussed. The photodiode, of course, is normally in a dark condition and therefore considered to be normally nonconductive. One terminal of the photodiode is connected to a positive potential source, while the opposite terminal is connected to the base electrode of a transistor illustrated as transistor Q2. This transistor is normally nonconductive and is rendered conductive during the interval that the photodiode is illuminated. The output signal from the transistor Q2 is derived form the collector electrode and applied as an input signal for controlling the cycle delay circuit 40. The cycle delay circuit 40 affords a 5 millisecond delay for effecting the starting of tape advancement and writing since at that time interval the shift register 14 has been loaded. The output signal from the cycle delay circuit 40 is applied to the inhibit holdover circuit which has been put in a conductive condition by the setting of the A flip-flop. Accordingly, with the reception of the signal from the cycle delay element 40, the inhibit holdover circuit is maintained conductive and remains conductive for approximately 40 milliseconds after loss of the signal from the cycle delay 40. This inhibit signal is coupled to the gate 18 controlling the key delay element 20 to a corresponding gate connected between the element 20 and the load one-shot element 21 and therefore prevents this circuit from triggering until the inhibit holdover has timed out; See FIG. 7C.

The "turn on clear "circuit" illustrated in top left of FIG. 8A is to establish the correct states for all key circuits immediately after power is turned on. This is accomplished by maintaining the transistor illustrated for this circuit conductive for several hundred milliseconds after power is turned on. After this initial interval, the circuit does not function in the system.

With the above structure in mind the detailed operation of the electronic system will now be examined. The information to be entered into the system and transmitted to a remote point is entered by means of the operation of the keys on the input device 10. With the operation of a key for entering a numerical data, for example, the associated reed switch is closed thereby causing the circuit to go to ground at the particular lead wire 101 individual to the closed reed switch. As mentioned hereinabove this condition is true for the machine cycle keys only after the machine cycle switch has been operated. This signal is detected by the particular NOR circuit of the encoding gates 12 for encoding the switch closure into the 8–4–2–1 binary code for entry into the shift register 14. It will be recalled that the logic of the NOR circuits 103—107 is such that if any input is at a ground potential level, the output of the NOR circuit is true or at a +5 volt level. Accordingly, if it is assumed that the digit key 0 is depressed the lead wire 101 associated therewith is at ground level and appears at the portion of the NOR gate 107 identified as the gate 5 or the output NOR circuit. The output from this gate 107, then, is a true signal and is applied at the input gate or the gate 10 for setting the parity flip-flop P to the 1 condition when the load clock pulse is received at the same gate. It will be noted that when the 0 key is depressed the input conditions at the remaining gates are not satisfied since they are all at the +5 volt level. Stated differently, the ground potential level resulting from operating the 0 key is not connected to any of the other NOR circuits 103—106. Accordingly, all of the other shift register cells are maintained in their normal 0 condition. The operation of the 0 key is sensed by the gate 110, since the signal from the gate 5 of the NOR circuit 107 is applied thereto as the output signal from the gate 10 and is coupled thereto by means of the lead wire 200. The sensing of the operation of the 0 key at gate 110 therefore triggers the key delay circuit 20.

This keying of the delay circuit 20 results since it is controlled by the gate 18 which has one input connected directly to the output signal from the gate 110 and its other input connected to the inhibit signal from the inhibit holdover circuit. Since this circuit is normally arranged with its output transistor in a nonconductive condition, the inhibit signal is in a true condition. The output signal from the gate 18 activates the key delay circuit 20 by rendering the transistor Q6 nonconductive to effect the desired 2 millisecond delay to compensate for any excess bounce as a result of the operation of the reed switch associated with the 0 key. This timing sequence may be best appreciated from examining FIG. 9 which shows the graphical relationship of the various waveforms in the system when any of the numerical keys 0—9 are operated. Accordingly, upon the expiration of the 2 millisecond delay introduced by the circuit 20, the load one-shot circuit 21 is triggered. The load pulse resulting from the triggering of the one-shot circuit 21 exists for approximately 30 milliseconds and is applied as a load clock pulse for each of the NAND circuits controlling the "set" input of the storage cells for the shift register 14. Since all of these NAND circuits are conditioned with the signals from the NOR circuits 103-—107 they will all produce their output signals simultaneously upon the application of the load clock signal thereto. However, since the 0 key was depressed, none of the NOR circuits 103—106 will produce an output signal and therefore all of the storage cells 8–4–2–1 will remain in their initial 0 state. The parity flip-flop of the shift register will be set to one as a result of the receipt of the load clock signal since its "set" input signal is derived from the NOR circuit 107. In the same fashion, the A flip-flop will be set to the 1 state since its "set" gating circuit is only coupled to respond to the load clock pulse. At this point in time, then, the shift register cells are loaded and correctly signal 000011. This represents the binary coded decimal digit 0 and the fact that the shift register cells have been loaded. The A flip-flop renders the inhibit holdover conductive to prevent additional load clock signals from being generated. It will be appreciated that with the operation of a shift flip-flop 47 the signals are sequentially stepped from the A cell to the 8 cell to record this information on tape by means of five pulses received from the shift flip-flop 47. At the end of this time the 1 stored in the A cell will be stored in the 8 cell.

Prior to proceeding with the storage of the binary bit 0 on the storage medium, at this point it may be well to examine the operation of further keys on the input device 10 for demonstrating the operation of the encoding gates relative to a more involved encoding procedure. For this purpose, it will be assumed that the digit key 6 is depressed. It will be recalled that in the 8–4–2–1 binary coded decimal system the decimal digit 6 is represented as the binary pattern 0110. With the depression of the digit key 6, the lead wire 101 associated with the key 6 will be placed at ground level. This voltage level, then, is coupled to the NOR circuits 104, 105 and 107. This ground level signal at the NOR circuit 104 causes a true output signal to appear at the NAND circuit 7 controlling the "set" input at the 4 cell of the shift register 14. In the same fashion then a true signal will be produced from the NOR circuit 105 for setting the 2 cell of the shift register 14. The true signal derived from the NOR circuit 107 is effective for setting the P cell. Accordingly, 2 milliseconds after the depression of the 6 key, the load clock signal will be produced and will cause the 4, 2, P and A cells to be set to the 1 state. The 8 and 1 cells will be maintained in the 0 state. At this point the shift register cells store the bits 011011 or the decimal digit 6. It will be recognized that this transfer of encoded signals into the shift register 14 is effected with the depression of the adding machine key and it does not require that the key be released to effect the transfer of the information into the shift register 14. Once the shift register 14 is loaded as will be appreciated from examining FIG. 9, no further action results until the key 6 is released and its associated reed switch returns to its normally open circuit condition.

When a machine function key is depressed, the same circuit action results except that the data signals are not loaded into the shift register 14 until after the machine cycle switch 31 operates to place the corresponding circuit at ground level. This timing signal is processed for recording the decimal digit represented by the machine function key in the same fashion as the 6 key to be described immediately hereinafter; See FIG. 10. The timing diagram for the clear C key, representative of the decimal digit 15 is illustrated in FIG. 11. The operation of the C key produces a signal that is coupled directly to the error flip-flop 60 for resetting it. The operation of this key also starts the timing of the key delay circuit 20 and the cycle delay circuit 40. It is immaterial to the timing of the system whether the C key remains depressed or turns to its normal position before, during or after data is loaded into the shift register 14 as long as it remains closed for at least 5 milliseconds for loading the shift register 14 and triggering the start one-shot element 41.

Now continuing with the discussion of the operation of the system resulting from the operation of the 6 key, when the 6 key is released, the adding machine carriage 22 is indexed one position to the left in accordance with the conventional operation of the machine. This indexing of the machine causes the photodiode 25 to be illuminated and therefore the movement of the carriage is detected causing the transistor Q2 that detects this indexing action to be rendered conductive. The detection of the carriage motion initiates the cycle delay element 40 which introduces the 5 millisecond delay for initiating the writing operation or the transfer of the information now stored in the shift register 14 onto the magnetic tape 23[a]. At the end of the 5 millisecond period the start one-shot circuit 41 is triggered. The triggering of the start one-shot element 41 in turn immediately triggers the tape motion flip-flop 42. The operation of the tape motion flip-flop is effective to trigger the pinch roller relay circuit 43 for moving the pinch roller 27 into driving engagement with the capstan roller 26. This causes the tape 23[a] to be advanced from the supply reel 25 to the takeup reel 24 past the read-write head 28. At this point it will be recalled that the mode selection control switch for the machine has been placed in the "write" position and therefore the motors 30, 31 and 32 are all energized to cause the desired advancement of the tape from the supply reel 25 to the takeup reel 24. When the start one-shot circuit 41 which has a switchover time of approximately 12 milliseconds, finishes timing out it will be switched back to its normal state. This state, the $\overline{\text{start}}$ state, will trigger the write clock 46; See FIG. 9. The write clock 46 provides pulses spaced approximately 1.8 milliseconds apart and having two half cycles that may be considered as the positive cycle on the first half cycle and the negative cycle during the second half cycle. These clock pulses cause double flux changes to be written onto the magnetic tape 23[a] when the shift flip-flop 47 and the 8 flip-flop are in the appropriate states. With the triggering of the write clock 46 to a conductive condition, then a positive going write clock signal is coupled to the shift flip-flop 47. Before any information is shifted in the shift register 14, however, in response to the triggering of the shift flip-flop 47, a write or timing signal is recorded on the magnetic tape. This is effected through the gate 50 of the write logic control 48.

Examining the input conditions of the gate 50 it will be noted that the shift flip-flop 47 is in the false condition or the "no-shift" condition and that the 8 cell of the shift register is storing the binary 0 and therefore its input is also false. Accordingly, with the arrival of the write clock pulse at the gate 50, a true output signal will be produced at the input to the read-write control circuit 53 or the $\overline{\text{write}}$ input thereto. This will cause a positive pulse to be recorded on the magnetic tape in response to the first half of the first write clock signal, as is evident form examining FIG. 9. With the first write clock signal passing through its second half cycle write logic of the flip-flop 47, is such that immediately before it reaches the zero reference level, the shift flip-flop 47 will be complemented so that it will now be placed in the "shift" state. With this shifting of the state of the flip-flop 47, however, no information is shifted in the shift register 14 so that all of the cells of the shift register 14 remain in their same storage condition. With the reversal of the write clock, however, the current through the winding 133 of the read-write head 28 will be reversed so that during this interval a negative signal will be recorded on the tape (See FIG. 9).

Then, considering the next or second clock pulse, it will be seen that during the first half cycle of this second clock pulse that neither the state of the 8 cell nor the state of the shift flip-flop 47 are correct to cause a positive pulse to be written on the tape. It will be recalled that the positive pulse recorded on the tape 23[a] is representative of the binary bit 1, while the absence of a pulse is representative of the binary bit 0. Accordingly, no pulses will be written on the tape during the interval of this second clock pulse to correctly record the binary bit 0, representative of the 0 bit stored in the 8 cell of the register 14. At the end of the first half cycle of the second clock pulse, however, the data bits are shifted in the shift register 14, one position, upwardly as illustrated FIGS. 7A and 7B so that the shift register cells reading from the top to the bottom now read 110110. Subsequent thereto the shift flip-flop 47 is complemented when the write signal goes through its second half cycle.

During the first half portion of the third clock pulse, the flip-flop 47 is now in the no-shift state and the write clock signal is written on the tape as a positive pulse followed by a negative pulse. On the first half cycle of the fourth clock pulse, a positive pulse is written on the tape because in this interval the 8 cell of the shift register 14 is storing the 1 previously stored in the 4 cell. This results since the input conditions of the gate 40 are all met with the 8 cell storing 1. As in the case of the writing of the clock signals on the tape a negative signal will also be associated with the positive pulse written on the tape as is evident from examining FIG. 9. Accordingly, this action continues as the information is shifted in the cells of the shift register toward the 8 cell with a positive pulse being recorded on the tape 23[a] each time a 1 is signalled as being stored in the 8 cell. The pattern of pulse representative of the digit 6 and the associated timing signals is illustrated in FIG. 9.

At the end of the tenth clock pulse, then, the shift register 14 will read 10000. The 1 stored in the 8 cell will be representative of the 1 that was originally stored in the A cell. With this logical pattern of output signals from the shift register 14, the input conditions for the end of character gate 54 are met and a true signal is derived therefrom. The true signal from the end of character gate 54 clears the tape motion flip-flop 42. With the change of state of the tape motion flip-flop 42, the pinch roller 27 is moved away from the tape 23[a] and therefore stops the tape motion so that no further information can be recorded. At this time, also, the write clock 46 is deenergized so that no further clock pulses are generated. About 40 milliseconds later the inhibit holdover circuit times out and provides a clear pulse an lead wire 201 that is applied to the "reset" terminals of all of the cells of the shift register 14 for placing them in their initial 0 state enabling them to accept new data in accordance with the subsequent key that is operated. Assuming for the present, another numerical key 0—9 is depressed, the same procedure will be followed, the operation of the key is sensed, after the key delay circuit 20 times out, a load clock pulse is applied to the shift register and the binary coded decimal bits are stored in the correct cells of the register 14. The tape 23[a] is advanced another increment to record this new information. The write clock pulse generator 46 is triggered on and these clock pulses are alternately recorded on the tape 23[a] with the binary bits stored in the register 14. A clock pulse is stored on the tape with each binary bit and a positive pulse is recorded for a binary 1. No pulse is recorded for a binary 0.

Figure 10:
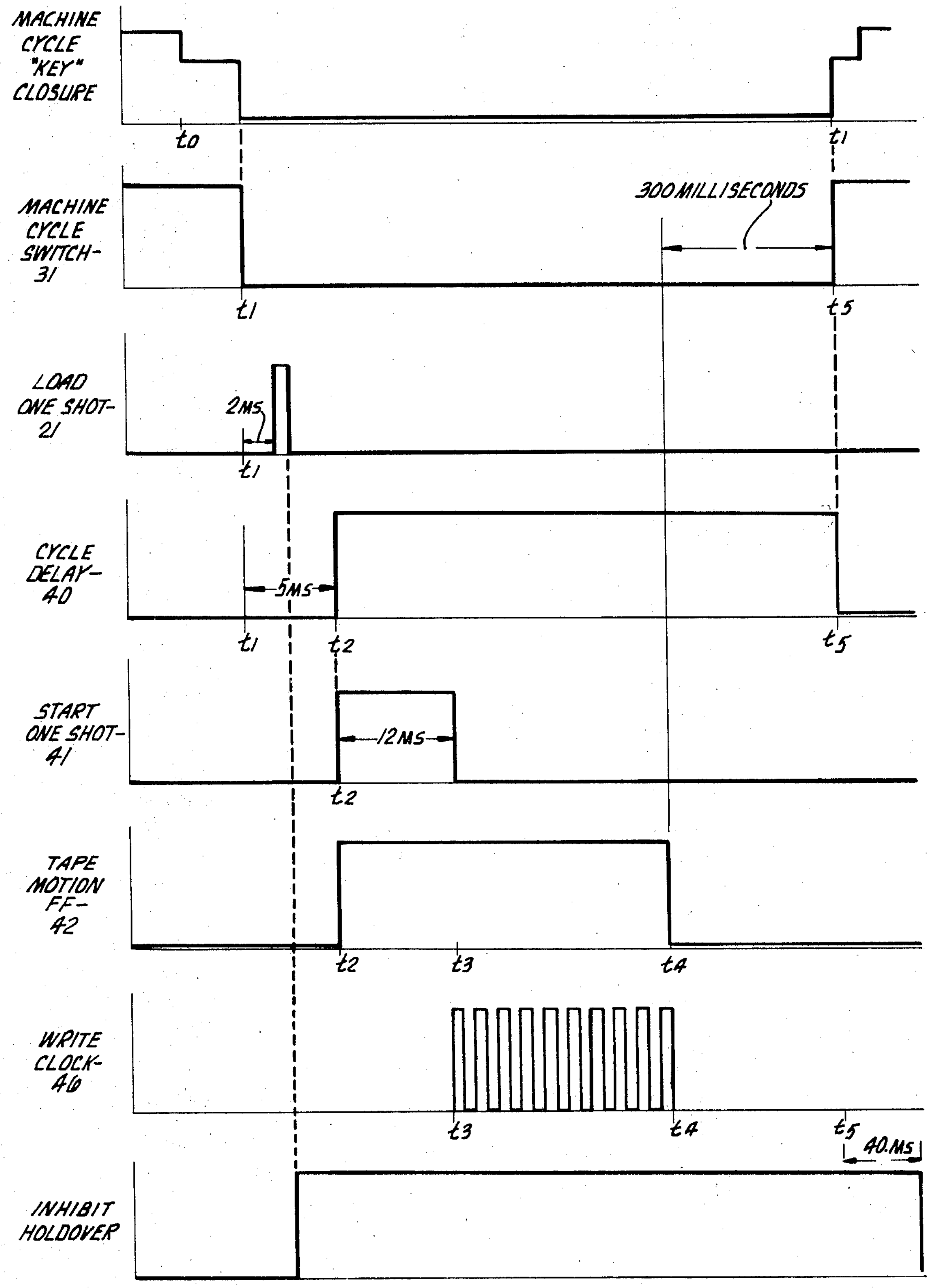
FIG. 10 is a timing diagram for recording information by means of the machine cycle keys of the input device of FIGS. 1 and 3.

It should now be evident that the entry of the data into the shift register 14 in response to the operation of the machine cycle keys is essentially identical to the described for the numerical keys 0—9 with the exception of the timing operation due to the difference in generating the timing cycle associated with the machine cycle keys. In summary, if a machine cycle key is depressed, nothing occurs in the system until the input device 10 motor starts going through the print cycle and goes through that portion of the cycle in which the machine cycle switch 31 closes. At this time the key delay circuit 20 and cycle delay circuit 40 being to time out. After 2 milliseconds, the shift register 14 is loaded and the inhibit holdover is turned on. 3 milliseconds later, the start one-shot 41 and the tape motion flip-flop 42 are turned on. When the start one-shot circuit times out, the write generator 46 is turned on and the data bits are stored on the magnetic tape 23[a]. When the "end of character" signal is detected, the tape advancement is stopped and the write generator 46 is turned off. These sequences of events are illustrated in FIG. 10. From examining FIG. 10, it can be determined that at this time, the machine cycle input is still on and remains on for approximately 300 milliseconds. At this time, there may be inputs from the carriage motion detector, since in the normal operation of the input device 10 upon operation of the + (motor bar), − (minus), and N keys, the carriage is moving back to the right thereby illuminating the photocell 25 through the apertures 23[a] as they are rapidly passed through the light rays. This has no effect on the system since the inhibit holdover prevents any further action. The only operation left before new data can be entered, is the timing out of the inhibit holdover circuit. This occurs 40 milliseconds after the machine cycle input goes TRUE.

The entry of data in response to the operation of the C, clear, key is as described hereinabove and is illustrated in FIG. 11. It will be noted that it merely requires that the clear key switch be maintained closed to allow the shift register 14 to be loaded with C information and to trigger the start one-shot 41. In the event, the C key remains depressed after the tape advancement is arrested and the write clock turned off, the start one-shot 41 cannot be retriggered until the C key has been released for sufficient time to allow the 40 millisecond inhibit holdover to time out.

It should now be evident that if during the keying operation the operator depresses two keys at the same time that the double key detect circuit 57 will be rendered conductive and that the error light in the input device 10 will be illuminated; in addition a steady tone will be produced from the speaker 66. This will signal the operator that he has improperly keyed the machine and will cause him to operate the clear, C, key to remove the error lockout condition in the electronics and to record a C character (15) on tape 23[a]. Once this is done, the operator may proceed to correctly operate the machine for recording the desired data.

In the event that there is an equipment failure and the error light is illuminated it will be detected by the load compare gates 67. An equipment failure may include the fact that the reed switches fail to close, the carriage motion signal fails due to no carriage motion or the optical system associated with the carriage indexer fails. If the correct data is not properly loaded into the cells of the shift register 14 due to a cell being faulty or that the compare gates fail, a reed switch may be shorted and stays closed or any input line is short-circuited to ground or similar system failures. In addition at this same time the lockout solenoid 42 on the input device 10 locks out the keyboard so that no further printing is allowed upon the detection of such errors. Accordingly, no further information can be written on the paper tape of the input device 10 or the magnetic tape until after the error is corrected. The operation of the lockout solenoid is further disclosed in the aforementioned copending application.

When an error is detected, the following sequence of events occur:

The error flip-flop 60 is set, the output of the error flip-flop 60 turns on the error light 44 and the lockout solenoid 42 in the input device 10 and removes the audio clamp from the VCO 83 to allow the operator to be signalled. The error flip-flop 60 also disables the start one-shot 41 and the inhibit holdover. Disabling the inhibit holdover results in its timing out. When the inhibit holdover times out the shift register 14 is cleared. Disabling of the start one-shot 41 prevents initiation of tape motion. Therefore under these conditions this "invalid" data is not recorded on the tape 23[a] and nothing can be loaded into register 14 until the error flip-flop 60 is reset by the operation of the C key.

With all of the information constituting a message or "order" the system is in condition to transmit the recorded information. In order to transmit data the following occurs. The tape is rewound after the data is recorded. The rewinding is accomplished by placing the mode select control to the "rewind" position and then momentarily pushing the "GO" button. This sets the rewind flip-flop 300 which in turn drives the supply reel 25 in the rewind direction, removes all drive from the takeup reel 24 so that it rotates freely in response to the driving of the supply reel 25 and releases the pinch pad 29 so that there will be no drag on the tape. When the tape reaches the leader, the metal strip on the leader shorts the "Bot" post. This produces a signal which resets the rewind flip-flop 300 which in turn releases the pinch pad 29 and releases the rewind relay 34. At this time the drive from the supply motor 31 is removed and puts a DC voltage across the takeup motor 30 to bring the tape 23[a] to a rapid halt. The write flip-flop is cleared during rewind which removes all writing current from the tape head.

After rewind is accomplished the mode select control is placed in the "transmit" position. Again, the write flip-flop remains cleared which removes all write current from the read/write head 28 and "enables" the read amplifier 80. When the "GO" button was depressed the error flip-flop 60 is cleared and the C input gate is forced to ground by the read gate which in turn sends a signal through the cycle delay gate and the start one-shot to turn on the tape motion flip-flop. Because the system is in the transmit mode rather than the "-write" mode, the tape motion flip-flop stays on until the "Gap Holdover" circuit times out. This circuit times out only after at least one bit of data has been sensed (which clears the gap flip-flop) and after a continuous period of one second or more in which no further bits of data have been sensed. This second characteristic is achieved by the fact that the firing of the bit one-shot restarts the timing of the gap holdover circuit. Whenever the bit one-shot fails to fire for more than a second, the gap holdover circuit is allowed to time out.

This feature, in conjunction with the fact that writing the sequence TS on the tape places a 4-second gap of no data on tape, means that at the end of a recorded message the tape recorder stops automatically.

With the machine mode selection switch in the transmission mode and the tape stored back on the supply reel 25, the information recorded on the tape 23[a] may now be transmitted to the desired location. The transmission waveforms are illustrated in FIG. 2 along with the signals derived from the magnetic transducer 28 as a result of reading the signals recorded on the magnetic tape. It will be assumed that the decimal digit 10 is recorded on the tape and it will be noted from examining FIG. 12 that the binary coded decimal bits are indicated along with the timing signals and a 1 parity bit and which bit is employed at the receiver. The signals recorded on the magnetic tape are sensed by the read-write head 28 and applied to the read amplifier 80. The signals that are recorded on the magnetic tape are amplified by the read amplifier 80 to about a 4-volt peak to peak level, as illustrated in FIG. 12. The positive half of these cycles is of a sufficient amplitude amplitude to exceed a preset voltage threshold for the bit one-shot 81. With the exceeding of this threshold the one-shot 81 is triggered which in turn triggers the modulator flip-flop 82. When the flip-flop 82 is in its 0 state it causes the voltage controlled oscillator 83 to emit a signal at the low frequency or at 1.3 kilocycles. With the switching of the flip-flop 82 into the 1 state, the oscillator 83 operates at the 2.1 kilocycle frequency. Thus, with each pulse from the one-shot 81 the frequency of the oscillator 83 is changed to reflect the information read from the magnetic tape 23[a]. The signals from the oscillator 83 are coupled to the acoustic coupler 84 by means of the driver 65 and by means of a speaker into the telephone for transmission to the desired spot. FIG. 12 further illustrates the train of transmitted pulses as received at the receiver.

We claim:

1. An electronic system comprising:

means for generating coded signals representative of data, means for temporarily storing each group of coded signals representative of data, means for permanently storing each group of coded signals representative of data, means for error checking each group of coded signals stored in the temporary storage means prior to transfer to the permanent storage means including means for comparing the complete identity of each signal stored in the temporary storage means with the corresponding signals generated by the first-mentioned means, and means for transferring the error checked, correct signals from the temporary to the permanent storage means.

2. An electronic system as defined in claim 1 wherein the permanent storage means comprises a magnetic storage means and the signals stored thereon are stored in a single track thereon.

3. An electronic system as defined in claim 1 wherein the generating means includes key operated means and the error checking means includes means for checking for the operation of two keys together.

4. A system for converting information for transmission by a conventional telephone, said system including:

input means for manually entering digital data and producing electrical signals corresponding thereto, said input means including means for generating a timing signal with the production of each electrical digital signal, encoding means connected to be responsive to the signals from the input means for encoding the signals into a group of bits of binary coded decimal signals, register means for temporarily storing the digital data as produced at the input means, means coupled to the input means to be responsive to each operation thereof for producing a signal at the encoding means to transfer the encoded signals into the register means, magnetic storage means connected to be responsive to the timing signals generated at the input means for producing writing control signals including timing signals for transfering the binary coded signals from the register means to the magnetic storage means in a preselected serial fashion whereby each binary bit is recorded with a timing signal, and means for serially reproducing the recorded information from the magnetic storage means for transmission purposes.

5. An electronic system for recording data comprising:

key operated means for generating electrical signals representative of a piece of data, means connected to be responsive to the generated electrical signals for encoding same into binary code electrical signals representative of the piece of data, means for temporarily storing the binary coded electrical signals, means connected to be responsive to the operation of a key for providing a signal for transferring the binary coded electrical signals into the temporary storage means, means for generating periodic timing signals, means for permanently storing electrical signals, means for shifting the binary coded electrical signals out of the temporary storage means in a serial fashion, means for recording a timing signal with each binary coded electrical signal in the permanent storage means, and means for signalling the shifting out of all the binary coded signals from the temporary storage means and clearing same to allow the next keyed piece of data to be transferred thereto.

6. An electronic system as defined in claim 5 including means connected to the key operated means for detecting the operation of two keys at substantially the same time and signalling the error to an operator.

7. An electronic system as defined in claim 5 including means for detecting that the correct signals have been transferred into the temporary storage means and signalling any errors.

8. An electronic system as defined in claim 6 including means for detecting that the correct signals have been transferred into the temporary storage means and signalling any errors.

9. An electronic system as defined in claim 5 wherein the key operated means comprises a conventional key operated adding machine including means for generating electrical signals in response to the operation of the keys.

10. An electronic system as defined in claim 9 wherein the adding machine includes means for generating a timing signal with the operation of the keys and the temporary storage means comprises an electronic shift register, said shifting means and said means for generating periodic timing signals being connected to be responsive to the key generated timing signals for storing the binary coded signals in the permanent storage means.

11. An electronic system as defined in claim 10 wherein the permanent storage means is a magnetic tape system adapted for reel to reel operation and having a magnetic transducer for receiving the binary coded electrical signals and the periodic timing signals for recording them in a single track on the magnetic tape.

12. An electronic system as defined in claim 11 wherein the magnetic transducer comprises a single winding, single gap for recording and reproducing electrical signals and includes means for reproducing the recorded electrical signals from the magnetic tape.

13. An electronic system as defined in claim 9 wherein a plurality of keys mount permanent magnets and a reed switch is mounted on the machine adjacent to each key mounting a magnet for operating the reed switch in response to the operation of a key by means of the permanent magnets to cause the key operation to provide the electrical signals.

14. An electronic system as defined in claim 13 wherein the adding machine includes means for generating a timing signal with the operation of each key.

15. An electronic system comprising:

input means for manually entering numerical data and producing electrical signals corresponding thereto, said input means including means for generating a timing signal with the production of each electrical numerical signal, encoding means connected to be responsive to the signals from the input means for encoding each signal into a group of binary coded bits representative of each number, shift register means for temporarily storing each group of binary coded bits in a parallel circuit relationship as received from the encoding means, register loading control means coupled to be responsive to the manual operation of the input means for producing a signal at the encoding means to transfer all of the encoded signals into the shift register means, magnetic tape storage system adapted for reel to reel operation, means for driving the tape system to cause the tape to be transported from one reel to the other reel past the transducing means, read/write transducing means comprising a single winding, single gap for recording and reproducing electrical signals for the tape storage system, tape writing control means coupled to be responsive to the timing signals from the input means for actuating the tape driving means, said control means including means for generating periodic timing signals, register shifting means connected to be responsive to the periodic timing signals and having its output signals coupled to the shift register means for serially shifting the signals stored therein, writing control means coupled between the outputs of the shift register means, the register shifting means and the timing signal generator and the winding of the transducing means, the operation of the register shifting means in response to the periodic timing signal being to alternately energize the winding of the transducing means with a timing signal and a binary coded bit shifted out of the shift register means.

16. An electronic system as defined in claim 15 wherein the input means comprises a conventional manually operated adding machine having a plurality of keys, and switching means associated with each key for producing the electrical numerical signals.

17. An electronic system as defined in claim 15 including:

means for detecting that the correct signals are stored in the shift register means.

18. A system for transmitting information comprising:

adding machine means for manually entering numerical data and having means for printing out the numerical data entered into the machine, said machine including means for generating an electrical signal corresponding to each piece of numerical data entered into the adding machine,
said machine further including means for generating an electrical timing signal corresponding to each entry into the machine,
means for encoding the electrical signals from the adding machine into binary coded numerical signals,
means for temporarily storing the binary coded electrical signals,
means for generating timing signals at preselected intervals,
storage means for recording and reproducing therefrom the stored binary coded electrical signals,
means for transferring the signals from the temporary storage means onto said latter mentioned storage means in combination with the timing signals, the recording means receiving the information transferred thereto in a sequential fashion whereby a timing mark is recorded with each recorded information mark adjacent thereto,
means for reproducing the information transferred to the recording and reproducing storage means as electrical signals,
means for converting the electrical signals into audiosignals with the successive recorded marks being effective to shift the audiosignals between different audio frequencies,
and means for coupling the audiosignals to a dataphone to be transmitted to a preselected location.

19. A method of recording data including the steps of:
generating electrical signals for each piece of data to be recorded,
substantially simultaneously with the generation of the data signals producing a permanent record of each piece of data to be recorded,
encoding each data signal into a group of binary coded bit signals representative of the data to be recorded,
producing periodic timing signals,
recording each timing signal in a track on a storage medium, and
recording each binary bit of the binary coded signals on the storage medium in the same track with an individual timing signal in serial fashion so that the two signals are alternately and sequentially recorded in the same track.

20. A method of recording data as defined in claim 19 wherein the storage medium is a magnetic tape storage unit and the timing signals are first recorded followed with a binary bit signal, and reproducing the thus recorded signals in serial fashion for transmission.

21. A method of transmitting digital information including the steps of recording the numerical information in accordance with the steps of claim 19,
reproducing the recorded signals as electrical signals,
converting the electrical signals to audiosignals with the successive signals being effective to shift the audiosignals between different audio frequencies in accordance with the generated data signals, and
transmitting the audiosignals by means of a telephone.

22. A method of recording data including the steps of:
generating electrical signals for each piece of data to be recorded by an operator,
along with the generation of the signals producing a visible, permanent record of the data represented by the generated electrical signals,
signalling any errors as produced in the aforementioned steps for generating the electrical signals for each piece of data or resulting from malfunctions of the generating means,
correcting any signalled errors or operator errors, and
recording only the correct or corrected binary coded electrical signals on a storage medium,
and in the event erroneous information is recorded on the storage medium correcting the erroneously recorded information.

23. A method of recording numerical information including the steps of:
generating electrical signals for each piece of information to be recorded through manual input means,
substantially simultaneous with the generation of the electrical signal producing a permanent record of each piece of information to be recorded,
encoding each information signal into a group of binary coded bit signals representative of the information to be recorded,
verifying that no errors have been produced in the system,
correcting any errors that have been produced,
producing periodic timing signals, and
alternately and sequentially recording in a single track the timing signals and the binary bit signals so that each binary bit is associated with a timing signal.

24. A method of recording information for error free reproduction thereof,
generating electrical signals for each piece of data to be recorded representative of the data in a preselected binary code,
producing a written, legible record of each piece of data to be recorded to allow the operator to verify the correctness of the generation of the data signals,
temporarily storing the binary coded data signals,
checking the storage of the binary coded data signals to determine that the correct data signals have been stored,
producing a signal to the operator indicative of an error,
in the event an error is detected, correcting the error and repeating the above steps for the correct data signals,
generating timing signals, one for each data binary bit, and
transferring the correct data signals and the timing signals onto a single track of a storage medium allowing reproduction thereof.

25. A method of recording information as defined in claim 24 wherein the error signal is a visible signal.

26. An electronic system comprising:
key operated means for generating coded signals representative of data,
means for receiving and storing the signals from the generating means,
means for error checking the signals in the storage means to determine the identity between the generated signals and the stored signals, said error checking means includes means for checking for the operation of two or more keys substantially simultaneously, and
means for magnetically storing the coded signals stored in the first mentioned storage means, said storage means comprising a single gap, single winding recording/reading transducer, and
means for transferring the error checked signals to the transducer for energizing the winding thereof to cause the signals to be recorded in a single track of the magnetic storage means.

27. An electronic system as defined in claim 26 wherein the key operated generating means produces data signals and a timing signal associated with each data signal, the data and timing signals being sequentially received by the transducer and serially recorded in the single track of the magnetic storage means.

28. An electronic system comprising:
input means for manually entering data and producing electrical signals corresponding thereto, said input means comprising manually operated keys representative of data to be entered into the system, and including means for generating a timing signal with the production of each data signal, the operation of a key causing the actuation of the means for generating the data signal and the release of an operated key causing the actuation of the means for generating the timing signal, encoding means connected to be responsive to the data signals from the input means for encoding the received data signals into a group of bits of binary coded signals, register means for receiving and temporarily storing the encoded data signals, means for error checking the encoded signals stored in the register to determine the identity with the signal generated by the operated key before the key is released, means for determining the presence of signals in the register after the key is released, means for checking for the operation of two or more keys, magnetic storage means for storing the error checked signals received from the register, and means connected to be responsive to the timing signals generated upon the release of the operated key for transferring the correct signals from the register to the magnetic storage means.

29. An electronic system as defined in claim 28 including means for signalling any errors detected by any of the aforementioned means.

30. An electronic system as defined in claim 29 wherein the magnetic storage means includes a single gap magnetic transducer for receiving the signals from the register and the timing signals whereby the timing signals effect the transfer of the register signals to the transducer to cause a register data signal and a timing signal to be serially recorded on the storage means in a single track.

31. A method of recording information for error free reproduction thereof, generating electrical data signals for each piece of information to be recorded and an associated timing signal, encoding the electrical data signals in accordance with a preselected code, temporarily storing the encoded signals, checking for errors in the stored signals by determining the identity between the temporarily stored signals and the encoded signals, signalling any errors determined to exist with respect to the stored signals, and transferring the error free stored signals along with the timing signals onto a magnetic tape recording/reproducing system so that the information signals and the timing signals are recorded in alternate serial fashion in a single track of the magnetic tape.

32. An electronic system comprising:

an adding machine having a plurality of manually operated keys for entering data into the machine and mechanical data storage means having a plurality of storage positions and responsive to the actuation of the individual keys for mechanically recording the data represented by an actuated key, the mechanical data storage means being movable from storage position to position to accept the data to be entered into the machine with the sequential operation of the keys, the machine further including means for releasably holding the storage means in a storage position and responsive to the release of an actuated key for moving the data storage means to the next successive storage position, means for transferring the information from the mechanical data storage means for mechanically recording the information in the machine proper for use thereby, the improvement comprising means for sensing the actuation of a machine key and providing an electrical data signal representative of the actuated key in terms of a preselected code, means for receiving and storing the key actuated electrical data signals, and means for error checking each group of coded data signals while stored to determine the correct operability of the adding machine, data signal generating means and the associated system circuit means.

33. An electronic system as defined in claim 32 wherein the error checking means includes means for determining the operation of two or more keys substantially simultaneously.

34. An electronic system as defined in claim 32 wherein the error checking means includes means for determining the presence of data signals in the storage means.

35. An electronic system as defined in claim 32 wherein the error checking means includes means for comparing the complete identify between each of the coded signals as generated with each of the corresponding coded signals in the storage means.

36. An electronic system as defined in claim 32 including means for transferring the coded signals from the machine to the storage means, the depression of a key causing the actuation of the transfer means for transferring the coded signals into the storage means.

37. An electronic system as defined in claim 36 including means for sensing the movement of the mechanical data storage means from position to position and providing an electrical timing signal indicative of the movement from position to position and wherein the electrical data storage means is a temporary storage means and the system further includes permanent storage means for receiving and storing the coded signals stored in the temporary storage means, and means for transferring the signals from the temporary storage means to the permanent storage means, the release of a depressed key causing the actuation of the mechanical data storage means and the generation of a timing signal for actuating the means for transferring the signals from the temporary to the permanent storage means.